(12) United States Patent
Mashimo

(10) Patent No.: US 7,245,579 B2
(45) Date of Patent: Jul. 17, 2007

(54) HIGH-DEFINITION OPTICAL DISK AND HIGH-DEFINITION OPTICAL DISK DRIVE

(75) Inventor: Akira Mashimo, Tokorozawa (JP)

(73) Assignee: TEAC Corporation, Musashino-shi (JP)

( * ) Notice: Subject to any disclaimer, the term of this patent is extended or adjusted under 35 U.S.C. 154(b) by 559 days.

(21) Appl. No.: 10/877,537

(22) Filed: Jun. 25, 2004

(65) Prior Publication Data

US 2004/0264326 A1 Dec. 30, 2004

(30) Foreign Application Priority Data

Jun. 27, 2003 (JP) ............................. 2003-185421
Sep. 26, 2003 (JP) ............................. 2003-336504

(51) Int. Cl.
*G11B 7/24* (2006.01)
*G11B 5/09* (2006.01)

(52) U.S. Cl. ................ 369/275.4; 369/275.1; 369/30.01; 369/47.28; 369/53.2

(58) Field of Classification Search ...................... None
See application file for complete search history.

(56) References Cited

U.S. PATENT DOCUMENTS

| 6,122,233 A | 9/2000 | Iketani et al. | |
|---|---|---|---|
| 6,772,429 B2 * | 8/2004 | Yoon et al. | 369/275.4 |
| 2001/0050888 A1 * | 12/2001 | Eguchi et al. | 369/47.48 |
| 2004/0264324 A1 | 12/2004 | Mashimo | |
| 2005/0122890 A1 * | 6/2005 | Ando et al. | 369/275.4 |

FOREIGN PATENT DOCUMENTS

| JP | 10214438 | 8/1998 |
|---|---|---|
| JP | 10312541 | 11/1998 |
| JP | 11149644 | 6/1999 |

OTHER PUBLICATIONS

Office Action dated Jan, 4, 2005, in Japanese Application Serial No. 2003-336506 (now Patent No. JP2005-038566, published Feb. 10, 2005), with English translation.
Office Action dated Feb. 22, 2007, in U.S. Appl. No. 10/877,365, filed Jun. 25, 2004.

\* cited by examiner

*Primary Examiner*—Muhammad Edun
(74) *Attorney, Agent, or Firm*—Christensen O'Connor Johnson Kindness PLLC

(57) ABSTRACT

A high-definition optical disk and a high-definition optical disk drive, which record data on lands and grooves. Wobbles are formed in grooves and lands of an optical disk, and address information is embedded in the wobbles. The wobbles are formed so as to become in phase with each other in the grooves. An address of the land sandwiched between the grooves is detected from the wobble of the groove. When the wobble of the land is not an in-phase wobble but is of opposite phase, a gray code of the wobble is substituted with a binary address such that 0 is achieved when the gray code is converted into the binary address. As a result, even in the case of the wobble of opposite phase, the address information about the land is made coincident with address information about an inner-radius-side adjacent groove, thereby determining address information about the land.

40 Claims, 20 Drawing Sheets

| | G TRACK ADDRESS (GRAY CODE) | | | | | | | |
|---|---|---|---|---|---|---|---|---|
| | MSB | | | | | | | LSB |
| GROOVE N | 0 | 0 | 0 | 0 | 0 | 0 | 0 | 0 |
| LAND N | 0 | 0 | 0 | 0 | 0 | 0 | 0 | X |
| GROOVE N+1 | 0 | 0 | 0 | 0 | 0 | 0 | 0 | 1 |

~100

DETECTED SIGNAL

| | G TRACK ADDRESS (GRAY CODE) | | | | | | | |
|---|---|---|---|---|---|---|---|---|
| | MSB | | | | | | | LSB |
| GROOVE N+1 | 0 | 0 | 0 | 0 | 0 | 0 | 0 | 1 |
| LAND N+1 | 0 | 0 | 0 | 0 | 0 | 0 | X | 1 |
| GROOVE N+2 | 0 | 0 | 0 | 0 | 0 | 0 | 1 | 1 |

~100

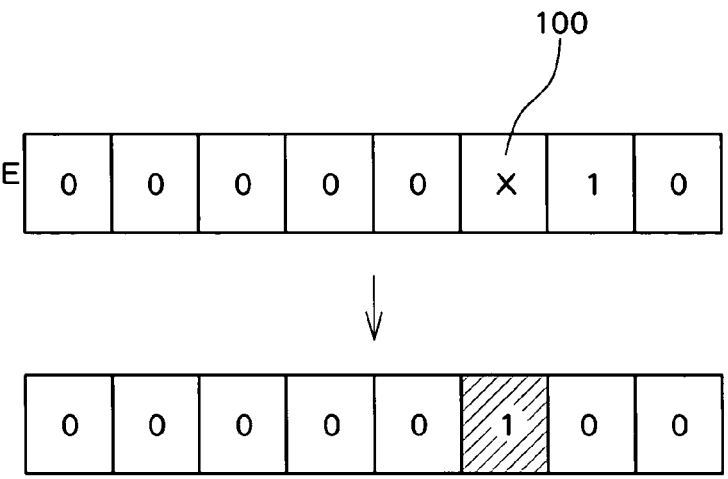
Fig. 18A
Fig. 18B
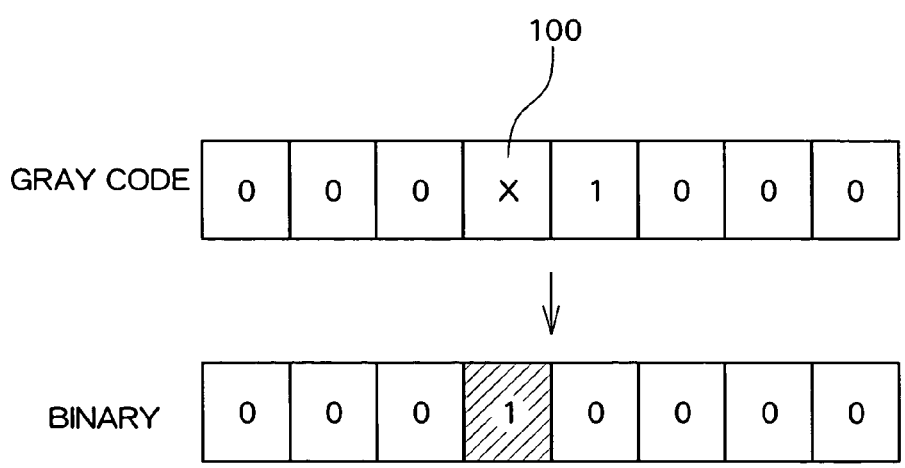
Fig. 19A
Fig. 19B

| | | Address 1 | Address 2 | |
|---|---|---|---|---|
| OUTER RADIUS (PERIPHERY) SIDE ↑ | | ⋮ | ⋮ | |
| | L3 | n+3 | NG | ... |
| | G3 | n+3 | n+2 | ... |
| | L2 | NG | n+2 | ... |
| | G2 | n+1 | n+2 | ... |
| | L1 | n+1 | NG | ... |
| ↓ INNER RADIUS (PERIPHERY) SIDE | G1 | n+1 | n+1 | ... |
| | | ⋮ | ⋮ | |

| ADDRESS | CODE SEQUENCE |
|---------|---------------|
| 0 | 00000000 |
| 1 | 00000001 |
| 2 | 00000011 |
| 3 | 00000010 |
| 4 | 00000110 |
| 5 | 00000111 |
| 6 | 00000101 |
| 7 | 00000100 |
| 8 | 00001100 |
| 9 | 00001101 |
| 10 | 00001111 |
| 11 | 00001110 |
| 12 | 00001010 |
| 13 | 00001011 |
| 14 | 00001001 |
| 15 | 00001000 |
| 16 | 00011000 |
| ⋮ | ⋮ |
| 253 | 10000011 |
| 254 | 10000001 |
| 255 | 10000000 |

HIGH-DEFINITION OPTICAL DISK AND HIGH-DEFINITION OPTICAL DISK DRIVE

BACKGROUND OF THE INVENTION

1. Field of the Invention

The present invention relates to an optical disk and optical disk drive, and more particularly, to a high-definition optical disk and a high-definition optical disk drive, which record/reproduce data through use of grooves and lands.

2. Description of the Related Art

There has hitherto been known an optical disk which achieves a high recording definition (or density) by means of recording data not only on a groove, but on both a groove and a land. When data are recorded on both the groove and the land in the manner as mentioned above, an address must be accurately detected from the groove and the land, respectively. In DVD-RAM, a special signal is inserted on a per-sector basis so as to be temporally independent of data recording according to a scheme called CAPA (Complementary Allocated Pit Address), and an address is detected by means of reproducing this special signal. Specifically, an address area (header section) which is independent of a data area is provided at the head of each sector. A plurality of CAPA signals are inserted into the header section while being offset right and left with respect to the groove or land in the data area. CAPA signals detected when data are recorded/reproduced on or from the groove differ from those detected when data are recorded/reproduced on or from the land. By utilization of this phenomenon, detection of an address from the groove and an address from the land is performed.

However, the optical disk has the address sections which are temporally independent of the data sections, and, therefore, there arises a problem of the data capacity of the optical disk being reduced correspondingly. Further, the groove and the CAPA signals are not arranged in a straight line, and hence there also arises a problem of manufacture of an optical disk encountering comparative difficulty. Moreover, there still exists a problem of a servo system employed for recording/reproducing data on/from the data section differing from that employed for recording/reproducing data on/from the header section, or a problem of the data section differing from the header section in terms of optimum points of parameters, such as servo parameters.

For these reasons, there has already been put forward a technique for determining the address of the land (hereinafter sometimes be called a "land address") as well as the address of the groove (hereinafter sometimes be called a "groove address") through use of wobbles to be used for storing the groove address.

When the groove is subjected to in-phase wobbling at a phase of 0°, 0 is recorded. When the groove is subjected to in-phase wobbling at a phase of 180°, 1 is recorded. Thus, address information is embedded. However, even when two adjacent grooves are subjected to in-phase wobbling, a land sandwiched between the two grooves is not necessarily subjected to in-phase wobbling, thereby failing to determine an address. In light of this problem, a technique for preparing two addresses and determining the land address through use of anyone of them is described in, e.g., Japanese Patent Laid-Open Publication No. Hei 10-312541.

FIG. 21 shows an address format described in the conventional technique.

The address includes an area address and a track address (i.e., a track number), and the area addresses of the respective segments arranged in the same direction are equal to each other. FIG. 21 shows only track addresses. Reference symbols G1, G2, G3, . . . denote grooves; and L1, L2, L3, . . . denote lands. Lower track numbers are located in an inner radius of the disk, and the track number increases from the inner radius to the outer radius. A track number assigned to G1 is n+1; a track number assigned to G2 is n+2; a track number assigned to L1 is n+1; and a track number assigned to L2 is n+2. As shown in FIG. 22, wobbles are formed in each of the grooves; 0 is recorded through use of the in-phase wobbles of 0°, and 1 is recorded through use of in-phase wobbles of 180°.

When attention is directed toward G1, L1, and G2, the track numbers assigned to G1, G2 originally differ from each other. Accordingly, the wobbles formed in G1 and those formed in G2 become out of phase with each other. In L1 sandwiched between G1 and G2, the wobbles of G1 and the wobbles of G2 are 180° out of phase with each other, and hence L1 becomes opposite in phase and cannot be detected. For this reason, in relation to Address 1, an identical track number is assigned to G1 and G2, thereby bringing the wobbles of L1 sandwiched therebetween in phase and enabling determination of a track number n+1. In Address 2, the original track number n+1 is assigned to G1, and the original track number n+2 is assigned to G2. Therefore, the address of L1 sandwiched between G1 and G2 cannot be detected, and hence NG is assigned to L1.

When attention is directed toward G2, L2, and G3, the track numbers assigned to G2, G3 originally differ from each other. Accordingly, the wobbles formed in G2 and those formed in G3 become out of phase with each other. In L2 sandwiched between G2 and G3, the wobbles of G2 and the wobbles of G3 are 180° out of phase with each other, and hence L1 becomes opposite in phase and cannot be detected. For this reason, in relation to Address 2, an identical track number is assigned to G2 and G3, thereby bringing the wobbles of L2 sandwiched therebetween in phase and enabling determination of a track number n+2. In this case, in Address 1, the address of L2 cannot be detected, and hence NG is assigned to L2.

When address data are recorded on the disk in the form of wobbles, recording is performed by means of converting binary data into a gray code. Here, the gray code is for setting an inter-code distance between two adjacent sets of binary data; that is, the number of inverted bits.

FIG. 23 shows a gray code converter 2 for converting binary data into a gray code. FIG. 24 shows a relationship between addresses and gray codes. The gray code converter 2 comprises a plurality of EX-OR (exclusive-OR) gates 1. For instance, when the address is made up of eight bits, the least significant bit LSB and the next lower bit are subjected to EX-OR operation, thereby determining the least significant bit LSB of the gray code. Similarly, adjacent bits in the address are subjected to EX-OR operation and converted into a gray code. The most significant bit MSB of the address is maintained intact and converted into a gray code. In the EX-OR operation, 0 is output when two inputs are identical with each other, and 1 is output when the two inputs differ from each other. Therefore, for instance, when binary data pertaining to the address are 00000000, the gray code will assume 00000000. When the binary data are 00000001, the gray code assumes 00000001. When binary data are 00000010, the gray code assumes 00000011. As can be seen from FIG. 24, the inter-code distance of a gray code existing between two consecutive addresses always assumes a value of 1.

As mentioned above, the land address and the groove address have hitherto been detected through use of the two addresses; that is, Address 1 and Address 2. However, forming two addresses in a disk beforehand is redundant, and a data recording density of the disk is decreased correspondingly. The conventional technique employs only one of the addresses. Even if the two addresses are used, effective utilization of a redundant address is not sought.

SUMMARY OF THE INVENTION

The present invention is intended toward increasing recording density by a great extent by means of deleting unnecessary address data. The present invention is also intended toward increasing the accuracy of detection of an address by means of effectively utilizing redundant system address data.

The present invention provides a disk into which address information is embedded by means of wobbling grooves and lands and which retains data in the grooves and the lands. The address information is embedded in a wobble after having been converted into a gray code which sets to one an inter-code distance between two successive address values. Address information about the land is defined by means of an in-phase wobble for which an inner-radius-side wobble and an outer-radius-side wobble, both constituting the land, are in phase with each other, and a wobble of opposite phase for which the inner-radius-side wobble and the outer-radius-side wobble are out of phase with each other.

The present invention also provides a disk into which address information is embedded by means of wobbling grooves and lands and which retains data in the grooves and the lands. The address information is embedded in a wobble after having been converted into a gray code which sets to one an inter-code distance between two successive address values. The address information about the groove is defined by means of an in-phase wobble for which an inner-radius-side wobble and an outer-radius-side wobble, both constituting the groove, are in phase with each other, and a wobble of opposite phase for which the inner-radius-side wobble and the outer-radius-side wobble are out of phase with each other.

The present invention also provides a disk into which track address information whose number sequentially increases from the inner radius to the outer radius of the disk is embedded by means of wobbling grooves and lands and which retains data in the grooves and the lands. The track address information is embedded in a wobble as a result of binary data being converted into a gray code which sets to one an inter-code distance between two successive address values. Track address information about the land is defined as a value represented by the wobble, in relation to an in-phase wobble for which an inner-radius-side wobble and an outer-radius-side wobble, both constituting the land, are in phase with each other. Track address information is defined as 0 in the binary data, in relation to a wobble of opposite phase for which the inner-radius-side wobble and the outer-radius-side wobble are out of phase with each other.

The present invention also provides a disk into which track address information whose number sequentially increases from the inner radius to the outer radius of the disk is embedded by means of wobbling grooves and lands and which retains data in the grooves and the lands. The track address information is embedded in a wobble as a result of binary data being converted into a gray code which sets to one an inter-code distance between two successive address values. Track address information about the groove is defined as a value represented by the wobble, in relation to an in-phase wobble for which an inner-radius-side wobble and an outer-radius-side wobble, both constituting the groove, are in phase with each other. Track address information is defined as 1 in the binary data, in relation to a wobble of opposite phase for which the inner-radius-side wobble and the outer-radius-side wobble are out of phase with each other.

The present invention provides an optical disk drive for recording/reproducing data on/from grooves and lands of an optical disk, wherein address information is embedded by means of wobbling the grooves and lands; and wherein the address information is embedded in the wobble after having been converted into a gray code which sets to one an inter-code distance between two successive address values. This drive comprises wobble signal generation means for generating a wobble signal by means of radiating a laser beam on the optical disk and receiving reflected light of the laser beam; and address information extraction means which extracts the address information from the wobble signal and which extracts address information about a land from an in-phase wobble for which an inner-radius-side wobble and an outer-radius-side wobble, both constituting the land, are in phase with each other, and a wobble of opposite phase for which the inner-radius-side wobble and the outer-radius-side wobble are out of phase with each other.

The address information extraction means has inverse conversion means for inversely converting the gray code into an address value of binary data. The inverse conversion means may extract address information about a land by means of inversely converting the gray code, in unmodified form, into a binary data value at a bit corresponding to the in-phase wobble and inversely converting the gray code into a binary data value fixed to 0 at a bit corresponding to the wobble of opposite phase.

The address information extraction means has detection means for detecting a bit from the wobble signal, the bit corresponding to the wobble of opposite phase. The inverse conversion means may also inversely convert the gray code into the binary data on the basis of a detected signal output from the detection means. When an address of a segment (the unit of a data area) which precedes in time the current segment is determined in the land, a bit corresponding to the wobble of opposite phase is not actually detected from the wobble signal but a bit in the next segment, the bit corresponding to the wobble of opposite phase of the wobble signal, may be predicted on the basis of the determined address, and the gray code may be inversely converted into the binary data on the basis of a result of prediction. The prediction result may be compared with an actually-detected result, thereby verifying the prediction result.

The inverse conversion means has a gate circuit which outputs the most significant bit of the gray code, in unmodified form, and EX-OR operation is obtained as a result of subjecting to EX-OR operation bits located lower than the most significant bit of the gray code and bits of binary data which are higher than the lower bits by one; and switching means for switching a signal input to the gate circuit. The switching means may operate so as to be switched at a bit corresponding to the in-phase wobble such that the bit of the gray code is input to the gate circuit, as well as to be switched at a bit corresponding to the wobble of opposite phase such that the bit of the gray code is interrupted and such that a bit of binary data which is higher than the interrupted bit by one is input to the gate circuit.

The optical disk drive may further comprise means for detecting whether or not all bits of the binary data output from the inverse conversion means, the bits being lower than a bit corresponding to the wobble of opposite phase, assume 1.

The optical disk drive may further comprise means for comparing the address information extracted by the address information extraction means with address information exclusive to the lands that have been formed in the optical disk beforehand and read from the disk.

The present invention provides an optical disk drive for recording/reproducing data on/from grooves and lands of an optical disk, wherein address information is embedded by means of wobbling the grooves and lands; and wherein the address information is embedded in the wobble after having been converted into a gray code which sets to one an inter-code distance between two successive address values. This drive comprises wobble signal generation means for generating a wobble signal by means of radiating a laser beam on the optical disk and receiving reflected light of the laser beam; and address information extraction means which extracts the address information from the wobble signal and which extracts address information about a groove from an in-phase wobble for which an inner-radius-side wobble and an outer-radius-side wobble, both constituting the groove, are in phase with each other, and a wobble of opposite phase for which the inner-radius-side wobble and the outer-radius-side wobble are out of phase with each other. The address information extraction means has inverse conversion means for inversely converting the gray code into an address value of binary data. The inverse conversion means may extract address information about a groove by means of inversely converting the gray code, in unmodified form, into a binary data value at a bit corresponding to the in-phase wobble and inversely converting the gray code into a binary data value fixed to 1 at a bit corresponding to the wobble of opposite phase.

The address information extraction means has detection means for detecting a bit from the wobble signal, the bit corresponding to the wobble of opposite phase. The inverse conversion means may also inversely convert the gray code into the binary data on the basis of a detected signal output from the detection means. When an address of a segment (the unit of a data area) which precedes in time the current segment is determined in the groove, a bit in the next segment, the bit corresponding to the wobble of opposite phase of the wobble signal, may be predicted on the basis of the determined address, and the gray code may be inversely converted into the binary data on the basis of a result of prediction. The prediction result may be compared with an actually-detected result, thereby verifying the prediction result.

The present invention provides an optical disk drive for recording/reproducing data on/from grooves and lands of an optical disk, wherein address information is embedded by means of wobbling the grooves and lands; and wherein the address information is embedded in the wobble after having been converted into a gray code which sets to one an inter-code distance between two successive address values. This drive comprises address information extraction means which extracts address information about a land from an in-phase wobble for which an inner-radius-side wobble and an outer-radius-side wobble, both constituting the land, are in phase with each other, and a wobble of opposite phase for which the inner-radius-side wobble and the outer-radius-side wobble are out of phase with each other. The address information extraction means has detection means which computes an address value of immediately subsequent binary data from the address value of the binary data determined from the address information exclusive to the lands formed in the optical disk beforehand, thereby detecting a bit corresponding to the wobble of opposite phase from an address value of the determined binary data and an address value of the computed immediately-subsequent binary data; and inverse conversion means for extracting address information about a land by means of inversely converting the gray code, in unmodified form, into a binary data value at a bit corresponding to the in-phase wobble on the basis of a detected signal output from the detection means and inversely converting the gray code into a binary data value fixed to 0, at a bit corresponding to the wobble of opposite phase. A fixed relationship exists between the address value (a binary address) of the binary data and the gray code. A position where a bit is carried, which is determined when successive binary data (binary numbers) are compared with each other, corresponds to the position of a changing bit in a corresponding gray code. Specifically, when two successive binary numbers are given, a bit position where a smaller binary number assumes 0 and a bit position where a larger binary number assumes 1 are equal to the positions of changing bits in corresponding gray codes; that is, positions of wobbles of opposite phases. By utilization of this fact, the next binary address is computed from the determined binary address. The position of a changing bit in the gray code is computed from the two binary addresses.

In this case, the detection means can be constituted by means of including an inverter into which a bit of the determined binary address is input; and a gate circuit which receives, as inputs, an inverted output from the inverter and a bit of the computed next binary address, the bit being located at the same position as the bit of the determined binary address, and subjects the inverted output and the bit to AND operation. When the bit of the binary address is 0 and the bit of the next binary address is 1, an output from an AND gate comes to 1. In the case where the bits assume other combinations, the output from the AND gate comes to 0. Therefore, the bit position where the output from the AND gate comes to 1 is specified as the position of the changing bit.

The present invention provides an optical disk drive for recording/reproducing data on/from grooves and lands of an optical disk, wherein address information is embedded by means of wobbling the grooves and lands; and wherein the address information is embedded in the wobble after having been converted into a gray code which sets to one an inter-code distance between two successive address values. This drive comprises address information extraction means which extracts address information about a groove from an in-phase wobble for which an inner-radius-side wobble and an outer-radius-side wobble, both constituting the groove, are in phase with each other, and a wobble of opposite phase for which the inner-radius-side wobble and the outer-radius-side wobble are out of phase with each other. The address information extraction means has detection means which computes an address value of immediately-preceding binary data from the address value of the binary data determined from the address information exclusive to the grooves formed in the optical disk beforehand, thereby detecting a bit corresponding to the wobble of opposite phase from an address value of the determined binary data and an address value of the computed immediately-preceding binary data; and inverse conversion means for extracting address information about a groove by means of inversely converting the gray code, in unmodified form, into a binary data value at a bit corresponding to the in-phase wobble on the basis of a detected signal output from the detection means and inversely converting the gray code into a binary data value fixed to 1, at a bit corresponding to the wobble of opposite phase. As mentioned previously, when two successive binary numbers are given, the positions of changing bits in gray codes corresponding to the binary numbers are ascertained. Even when the address of the groove is extracted, an address value preceding the determined address value is computed, thereby detecting the position of a gray code from the two binary addresses. In the case of the land, an address subsequent to the determined address is computed through arithmetic operation. In the case of the groove, an address preceding the determined address is computed through arithmetic operation. The reason for this is that, when tracks are sequentially formed in the optical disk; that is, the groove "n," the land "n," the groove "n+1," the land "n+1,"..., a serial track number adjacent to the land "n" is a groove (n+1), and a serial track number adjacent to the groove "n" is a land (n−1).

When the tracks are sequentially formed in the optical disk; that is, the land "n," the groove "n," the land "n+1," the groove "n+1,"..., the only requirement is that, in the case of the land, an address preceding the determined address be computed through arithmetic operation and, in the case of the groove, an address subsequent to the determined address be computed through arithmetic operation, to thus detect the position of the changing bit.

According to the invention, the inverse conversion means comprises a gate circuit which outputs the most significant bit of the gray code in unmodified and which subjects to an EX-OR operation all bits of the gray code, the bits being lower than the most significant bit, along with bits of binary data being higher than the gray code by one, and outputs a result of EX-OR operation; and switching means for switching an output from the gate circuit. The switching means may be configured so as to output the output from the gate circuit at the bit corresponding to the wobble of opposite phase and to switch the output of the gate circuit at the bit corresponding to the wobble of opposite phase such that either 0 or 1 is fixedly output.

The invention will be more clearly comprehended by reference to the embodiments provided below. However, the scope of the invention is not limited to the embodiments.

BRIEF DESCRIPTION OF THE DRAWINGS

FIG. 3 is a timing chart of a wobble signal, wherein

FIG. 5 is a timing chart of individual sections of the circuit shown in FIG. 4, wherein

FIG. 14 is a view for describing inverse conversion of a gray code of a land into a binary address, wherein

FIG. 15 is a view for describing inverse conversion of a gray code of another land into a binary address, wherein

FIG. 18 is a view for describing inverse conversion of a gray code of a certain group into a binary address, wherein FIG. 18A is a view showing a gray code of a certain group; and FIG. 18B is a view showing a binary address of that group;

FIG. 19 is a view for describing inverse conversion of a gray code of another group into a binary address, wherein FIG. 19A is a view showing a gray code of another group; and FIG. 19B is a view showing a binary address of that group;

DETAILED DESCRIPTION OF THE PREFERRED EMBODIMENTS

An embodiment of the invention will be described hereinbelow.

Figure 1:
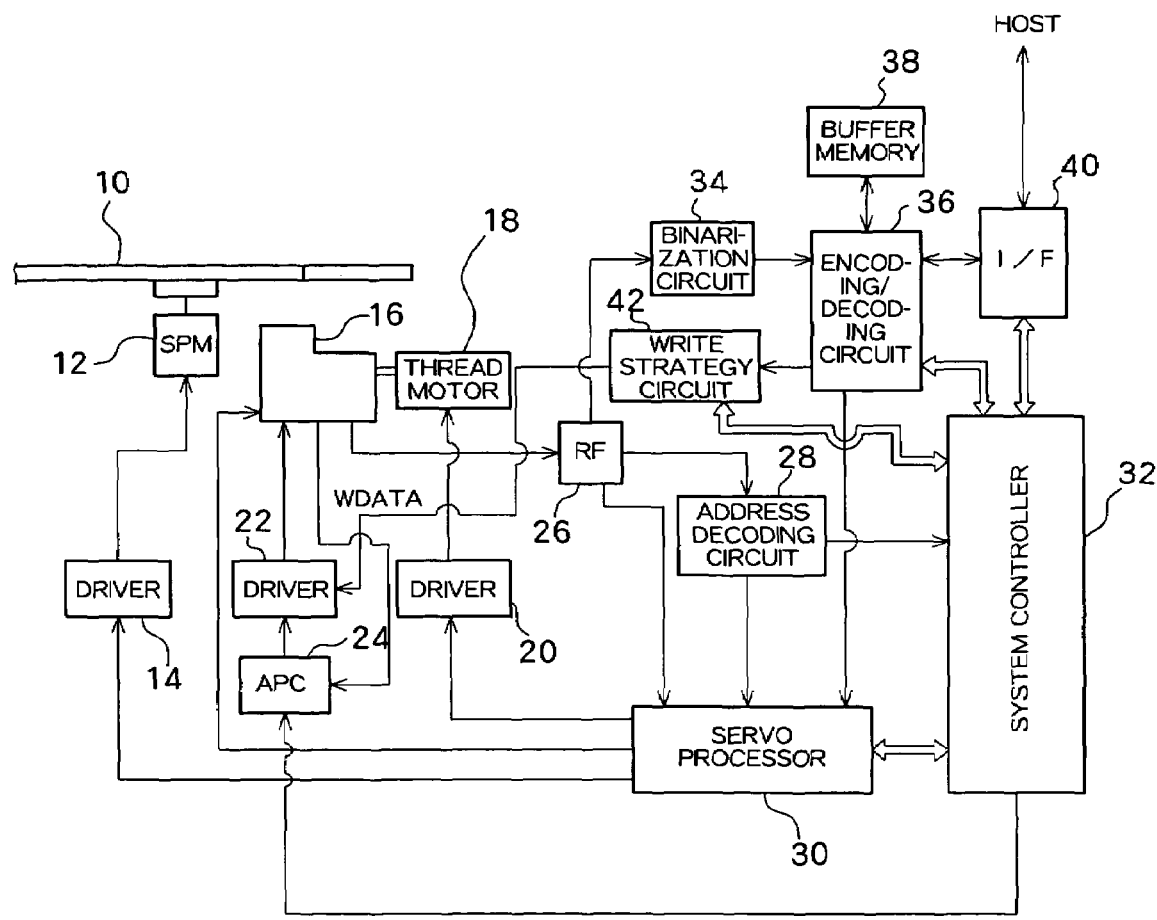
FIG. 1 is an overall diagram of an optical disk drive according to an embodiment of the present invention.

FIG. 1 is an overall diagram of an optical disk drive according to an embodiment of the invention. An optical disk 10 is rotationally actuated by a spindle motor (SPM) 12.

The spindle motor SPM 12 is driven by a driver 14, and the driver 14 is subjected to servo control performed by a servo processor 30 so as to achieve a desired rotational speed. In the embodiment, by way of an example, the driver 14 divides the optical disk 10 into a plurality of zones from the inner radius to the outer radius, and the driver 14 drives the spindle motor SPM so as to achieve a constant angular velocity in each zone.

An optical pickup 16 includes a laser diode (LD) for radiating a laser beam on the optical disk 10 and a photodetector (PD) which receives the light reflected from the optical disk 10 and converts the thus-received light into an electrical signal. The optical pickup 16 is disposed opposite the optical disk 10. The optical pickup 16 is driven by a thread motor 18 in a radial direction of the optical disk 10, and the thread motor 18 is driven by a driver 20. As in the case of the driver 14, the driver 20 is subjected to servo control performed by the servo processor 30. The LD of the optical pickup 16 is driven by a driver 22, and the driver 22 is controlled by an automatic power control circuit (APC) 24 such that a drive current assumes a desired value. The APC 24 controls a drive current of the driver 22 such that optimum recording power selected through optimum power control (OPC) performed in a test area (PCA) of the optical disk 10 is achieved. The OPC is processing for recording test data in the PCA of the optical disk 10 by means of changing recording power in a plurality of steps, reproducing the test data and evaluating the quality of a resultant signal, and selecting recording power by means of which desired signal quality is achieved. A β value, a γ value, a degree of modulation, jitter, or the like is used as an index of signal quality.

When the data recorded on the optical disk 10 are reproduced, a laser beam of reproducing power is emitted from the LD of the optical pickup 16. Reflected light of the laser beam is converted into an electrical signal PD, and the electrical signal is output. A reproduced output from the optical pickup 16 is supplied to an RF circuit 26. The RF circuit 26 generates a focus error signal and a tracking error signal from the reproduced signal and supplies the thus-generated error signals to the servo processor 30. The servo processor 30 subjects the optical pickup 16 to servo control in accordance with the error signals, thereby bringing the optical pickup 16 into an on-focus state and an on-track state.

The optical pickup 16 records/reproduces data on the grooves and the lands of the optical disk 10. The grooves are helically formed in the optical disk 10, and data are alternately recorded/reproduced on/from the groove and the land in sequence of, e.g., a groove 1, a land 1, a groove 2, a land 2, a groove 3, a land 3, . . . Alternatively, only grooves are subjected to recording/reproduction on a per-zone basis, and then lands are subjected to recording/reproduction. Thus, after all grooves belonging to a zone have been subjected to recording/reproduction, lands belonging to the same zone may be subjected to recording/reproduction. The RF circuit 26 supplies an address signal included in a reproduced signal to an address decoding circuit 28. The address decoding circuit 28 demodulates address data pertaining to the optical disk 10 from the address signal and supplies the address data to the servo processor 30 and a system controller 32. The address data are embedded as wobbles in the grooves and lands of the optical disk 10. The optical disk 10 includes an area address and a track address as address data. The address data are formed in the optical disk 10 as gray codes such as those shown in FIG. 24.

Figures 21, 22:
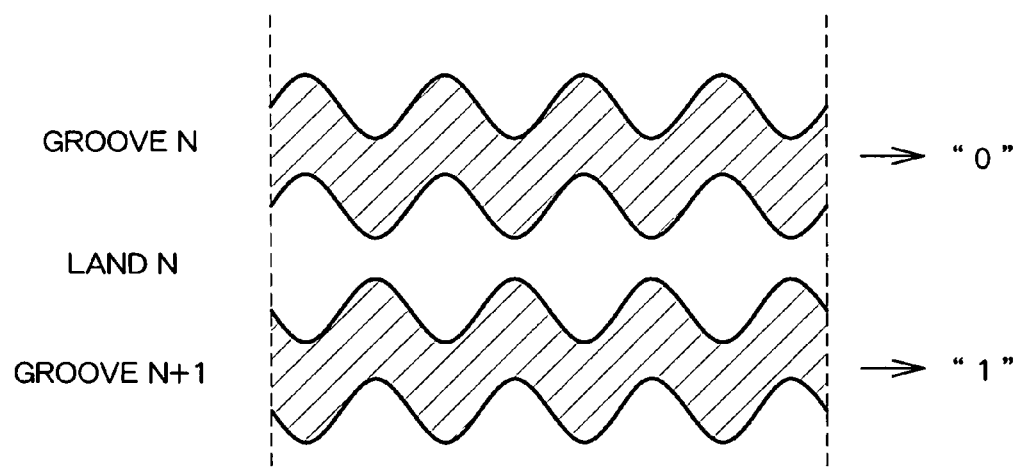
FIG. 21 is a descriptive view of a conventional address format.
FIG. 22 is a view for describing wobbles of a groove and wobbles of a land.

The address format of the optical disk 10 according to the embodiment is constituted not of two address systems but of one address system, as shown in FIG. 21. Specifically, track numbers which are consecutive from the inner radius to the outer radius are principally assigned to the grooves. The address format is specifically described by reference to FIG. 21. When the grooves and the lands are helically arranged in sequence of G1, L1, G2, L2, G3, . . . , the grooves are assigned track numbers in sequence of n+1, n+2, n+3 . . . . The system can also be expressed such that wobbles are formed in such a manner that in-phase wobbles have a phase of 0° and in-phase wobbles having a phase of 180° are obtained in all the grooves. In the embodiment, this address format is called a groove track address (G track address). In the embodiment, an address of a land sandwiched between grooves as well as an address of a groove is detected from such G track addresses. Specifically, an address is detected on the basis of a combination of wobbles assigned NG in FIG. 21.

In addition to sequentially forming the track numbers of the grooves as the address of the optical disk 10, two address systems may be formed, as shown in FIG. 21, such that the groove track addresses are detected through use of one address system and such that land track addresses (also called "L track addresses") are detected through use of the other address system. In this case, the land track addresses detected through use of the G track addresses can be used for verifying the L track addresses. Specifically, the embodiment has two modes:

(1) Only the G track address system is formed on the optical disk 10, and the L track address system is not formed; and (2) The G track address system and the L track address system are formed in the optical disk 10 in the same manner as in the conventional art. At the time of detection of the track address of the land, the L track address system formed in the optical disk 10 is used as a check address.

The RF circuit 26 supplies a reproduced RF signal to a binarization circuit 34. The binarization circuit 34 binarizes the reproduced signal and supplies a resultantly-obtained EFM signal (in the case of a CD disk) or an 8–16, modulated signal (in the case of a DVD disk) to an encoding/decoding circuit 36. The encoding/decoding circuit 36 produces reproduced data by means of demodulating a binarized signal and correcting an error and outputs the reproduced data to a host, such as a personal computer, by way of an interface I/F 40. When the reproduced data are output to the host, the encoding/decoding circuit 36 outputs the reproduced data after having temporarily stored the reproduced data in buffer memory 38.

When data are recorded on the optical disk 10, data which are output from the host and are to be recorded are supplied to the encoding/decoding circuit 36 by way of the interface I/F 40. The encoding/decoding circuit 36 stores the data to be recorded in the buffer memory 38; encodes the data to be recorded to produce modulated data; and supplies the thus-modulated data to a write strategy circuit 42. The write strategy circuit 42 converts the modulated data into multi-pulses (a pulse train) in accordance with a predetermined recording strategy and supplies the multi-pulses as record data to the driver 22. The recording strategy comprises, e.g., a pulse width of a leading pulse, a pulse width of a subsequent pulse, and a pulse duty in the multi-pulses. Since the recording strategy affects recording quality, it is usually fixed to a certain optimum strategy. The recording strategy may also be set during optimum power control (OPC). The laser beam whose power has been modulated by means of the record data is emitted from the LD of the optical pickup 16, whereby data are recorded on the optical disk 10. After recording of the data, the optical pickup 16 emits a laser beam of reproducing power, to thus reproduce the record data and supply the record data to the RF circuit 26. The RF circuit 26 supplies the thus-reproduced signal to the binarization circuit 34, and the binarized data are supplied to the encoding/decoding circuit 36. The encoding/decoding circuit 36 decodes the modulated data and verifies the thus-decoded data against the record data stored in the buffer memory 38. A result of verification is supplied to the system controller 32. In accordance with the verification result, the system controller 32 determines whether to successively record data or to perform alternation operation.

<When Only the G Track Address System is Formed>

In the embodiment, under an assumption that only the G track address is formed on the optical disk 10, there will now be described a method for detecting the address of a land track from the G track address when the land is subjected to recording/reproduction operation.

Figure 2:
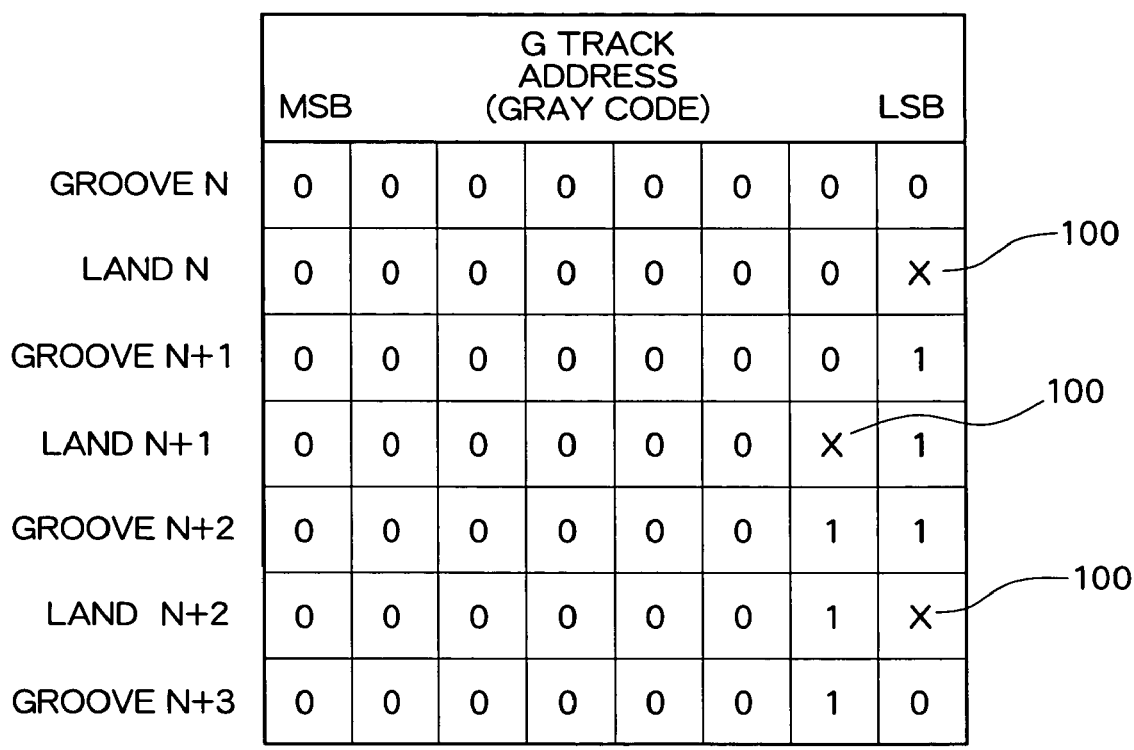
FIG. 2 is a descriptive view of a G track address system of the embodiment.

FIG. 2 shows an example G track address pertaining to a groove N, a land N, a groove N+1, a land N+1, a groove N+2, a land N+2, and a groove N+3, all being formed in the optical disk 10. The grooves and lands are formed helically from the inner radius to the outer radius. In-phase wobbles having a phase of 0° (inner-radius-side wobbles and outer-radius-side wobbles, both constituting the grooves, have a phase of 0°) or in-phase wobbles having a phase of 180° (inner-radius-side wobbles and outer-radius-side wobbles, both constituting the grooves, have a phase of 180°) are formed (see FIG. 22). Although in the drawing the address data are expressed as 8-bit data, the number of bits is not limited to eight. For instance, the address data may be expressed as 12-bit data. Binary data of the G track address are recorded after having been converted into a gray code which causes an inter-code distance between successive track numbers to assume a value of 1. More specifically, when the G track address of the groove N is 00000000, the G track address of the groove N+1 is 00000001, resulting from inversion of 00000000 by only the least significant bit LSB. The track address of the groove N+2 is 00000011, resulting from inversion of 00000001 by only one higher bit. The G track address of the groove N+3 is 00000010, resulting from inversion of 00000011 by only the least significant bit. Here, 0 is formed as an in-phase wobble having a phase of 0° as shown in FIG. 22, and "1" is formed as an in-phase wobble having a phase of 180°.

In relation to the address of the land N sandwiched between the groove N and the groove N+1, when both the groove N and the groove N+1 assume 0, in-phase wobbles having a phase of 0° are achieved. Hence, 0 can be detected as a wobble of the land N. In relation to the least significant bit, the wobble of the groove N is one which has a phase of 0°, and the wobble of the groove N+1 is one which has a phase of 180°. Hence, these wobbles are out of phase with the wobble of the land N, and hence nothing can be detected. Specifically, the inner-radius-side wobble and the outer-radius-side wobble, both forming the land N, are 180° out of phase with each other, and hence a wobble signal disappears. In the drawing, a bit for which data cannot be detected, as a result of wobbles becoming out of phase with each other, is taken as a change bit 100, which is indicated by "X."

In relation to the address of the land N+1 sandwiched between the groove N+1 and the groove N+2, when both the groove N+1 and the groove N+2 assume 0, in-phase wobbles having a phase of 0° are achieved. Hence, 0 can be detected as a wobble of the land N+1. When both the groove N+1 and the groove N+2 assume 1, in-phase wobbles having a phase of 180° are achieved. Hence, "1" can be detected as a wobble of the land N+1. In relation to a bit which is higher than the least significant bit by one, the wobble of the groove N+1 is one which has a phase of 0°, and the wobble of the groove N+2 is one which has a phase of 180°. Hence, these wobbles are out of phase with the wobble of the land N+1, and hence nothing can be detected.

In relation to the address of the land N+2 sandwiched between the groove N+2 and the groove N+3, when both the groove N+2 and the groove N+3 assume 0, in-phase wobbles having a phase of 0° are achieved. Hence, 0 can be detected as a wobble of the land N+2. When both the groove N+2 and the groove N+3 assume 1, in-phase wobbles having a phase of 180° are achieved. Hence, "1" can be detected as a wobble of the land N+2. In relation to the least significant bit, the wobble of the groove N+2 is one which has a phase of 180°, and the wobble of the groove N+3 is one which has a phase of 0°. Hence, these wobbles are out of phase with the wobble of the land N+2, and hence nothing can be detected. The adjacent track numbers have already been converted into a gray code which sets the inter-code distance to 1, and hence any of the eight bits becomes undefined.

As mentioned above, if an attempt is made to directly detect a land address, the address will become undefined. As can be seen from FIG. 2, for instance, the land N is originally given a binary address "00000000," which is the same as that of the groove N. So long as the binary address of X of the least significant bit is substituted with a binary address 0, the land address can be determined accurately. The land N+1 is also originally given a binary address "00000001," which is the same as that of the groove N+1. So long as the binary address of X of a bit (a first-order bit) next to the least significant bit is substituted with a binary address 0, the land address can be determined accurately. The land N+2 is also originally given a binary address "00000010," which is the same as that of the groove N+2. So long as the binary address of X of the least significant bit is substituted with a binary address 0, the land address can be determined accurately. In the present embodiment, the land address as well as the groove address is detected from only the G track address system on the basis of the principle mentioned above.

Detection of the land address performed in the present embodiment roughly comprises two steps; namely, a first step for detecting the X position shown in FIG. 2; i.e., a changing bit at which wobbles become out of phase with each other; and a second step for acquiring a binary address by means of substituting 0 for the value of a binary address bit in the changing bit.

<Detection of Position of the Changing Bit>

Figure 3A:
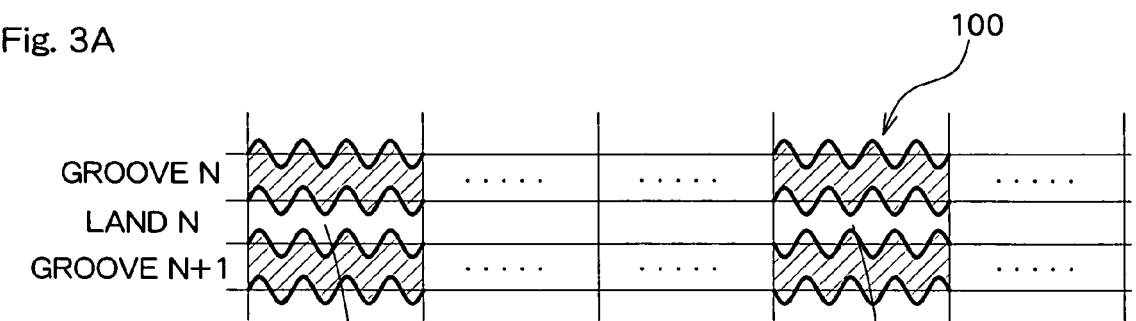
FIG. 3A is a view showing wobbles in a groove N and wobbles in a groove N+1.
Figure 3B:
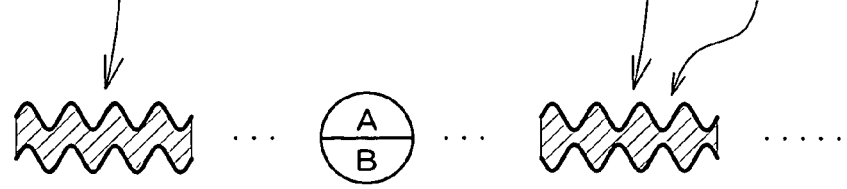
FIG. 3B is a view showing the position of a photodetector arranged at the time of recording/reproducing data on or from a land N and wobbles of the land N.
Figure 3C:
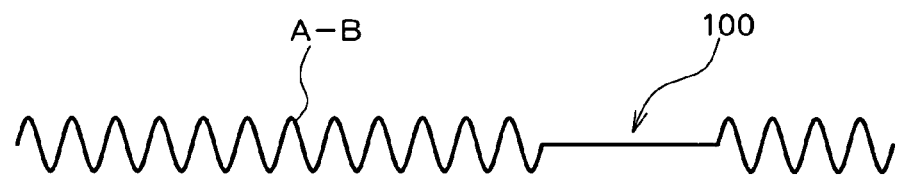
FIG. 3C is a view showing a difference between signals detected by the photodetector.

FIGS. 3A to 3C show timing charts for describing processing for detecting the position of the changing bit. FIG. 3A shows a wobble in the groove N and that in the groove N+1 and a changing bit 100; that is, an in-phase wobble having a phase of 0° in the groove N and an in-phase wobble having a phase of 180° in the groove N+1.

FIG. 3B shows the positions of the photodetectors when data are recorded/reproduced on/from the land N with a configuration, such as that shown in FIG. 3A, and extraction of only the wobble of the land N. A four-way split photodetector is used as the photodetector. Provided that two photodetectors arranged in the radial direction of the optical disk are taken as A, B (on the assumption that elements of the four-way split photodetector are taken as "a," "b," "c," and "d"; that "a" and "b" are located at inner radius positions; and that "c" and "d" are located at outer radius positions, the photodetector A=a +b and the photodetector B=c+d), the photodetector A detects a wobble located at an inner radius position among the wobbles provided on both walls of the land N; that is, a wobble having a phase of 0°, and the photodetector B detects a wobble located at an outer radius position among the wobbles provided on both walls of the land N; that is, a wobble having a phase of 180°.

FIG. 3C shows a difference A–B between signals detected by the photodetectors A, B shown in FIG. 3B. A signal whose amplitude is equal to or larger than a predetermined value appears in a bit of the in-phase wobble. The difference between phase-inverted wobble signals is computed at a position corresponding to the changing bit 100, and therefore the amplitude becomes substantially zero. Therefore, the amplitude of the difference A–B is detected, thereby detecting an area where the amplitude becomes substantially zero. Thus, the changing bit 100 can be detected.

Figure 4:
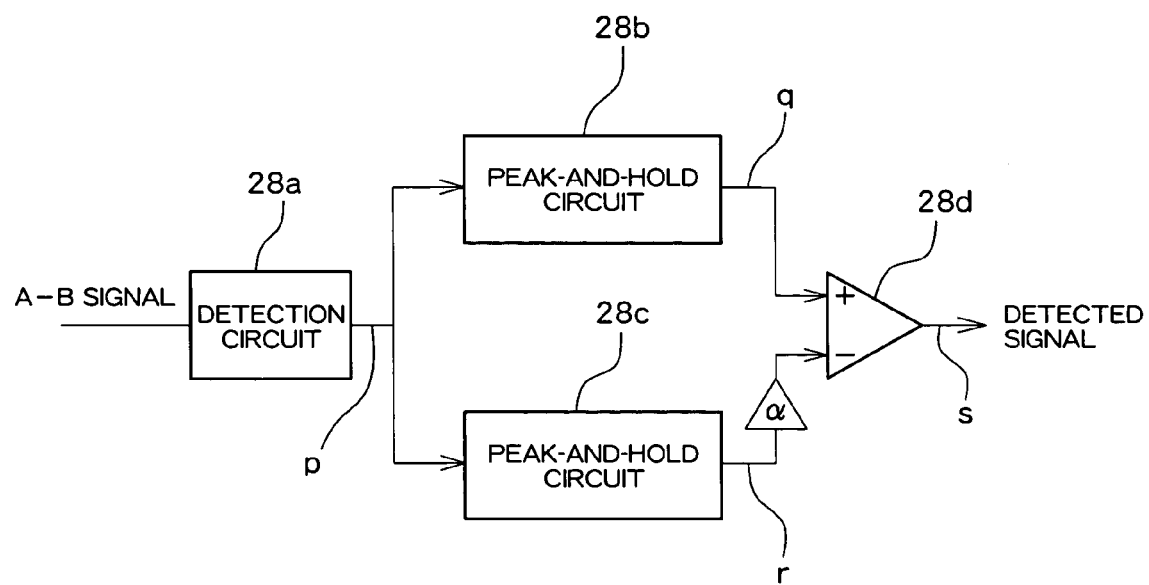
FIG. 4 is a block diagram of a changing bit detection circuit.

FIG. 4 shows a circuit configuration of a changing bit detection circuit included in the address decoding circuit 28 shown in FIG. 1. FIGS. 5A to 5E show timing charts of individual sections shown in FIG. 4. The changing bit detection circuit comprises a detection circuit 28a, two peak-and-hold circuits 28b, 28c, and a comparator 28d.

Figure 5A:
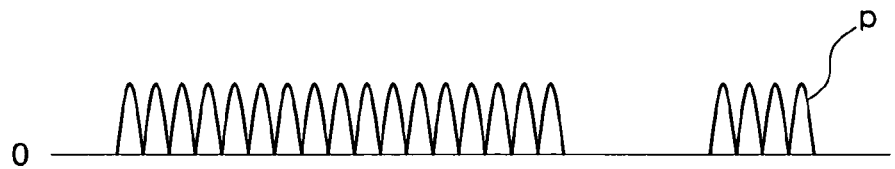
FIG. 5A shows a view showing a signal "p" output from a detection circuit.

The detection circuit 28a is supplied with the difference signal A–B of the photodetectors A, B. The difference signal A–B can be generated by means of the RF circuit 26. The detection circuit 28a detects the difference signal and outputs the thus-detected difference signal to the two peak-and-hold circuits 28b, 28c. FIG. 5A shows a signal "p" output from the detection circuit 28a.

Figure 5B:
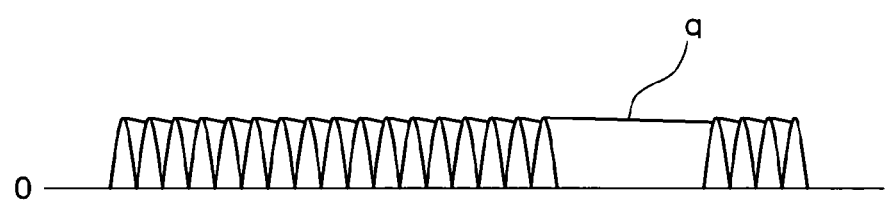
FIG. 5B is a view showing a signal "q" output from a peak-hold circuit.
Figure 5C:
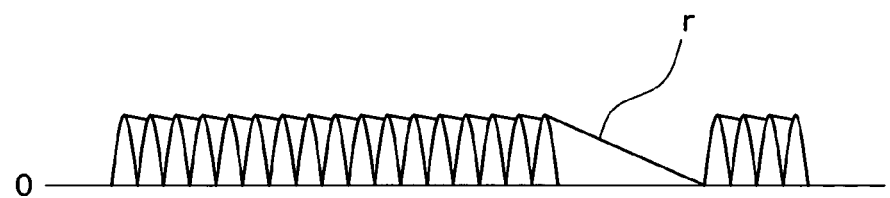
FIG. 5C is a view showing a signal "r" output from the peak-hold circuit.

The peak-and-hold circuit 28b has a large discharge time constant, and the peak-and-hold circuit 28c has a small discharge time constant. Since the peak-and-hold circuit 28b has a large discharge time constant, the amplitude of the signal is substantially maintained even at the position of the changing bit. In contrast, since the peak-and-hold circuit 28c has the small discharge time constant, the amplitude of the signal decreases abruptly at the position of the changing bit. FIG. 5B shows a signal "q" output from the peak-and-hold circuit 28b, and FIG. 5C shows a signal "r" output from the peak-and-hold circuit 28c. Signals output from the peak-and-hold circuits 28b, 28c are supplied to a comparator 28d.

Figure 5D:
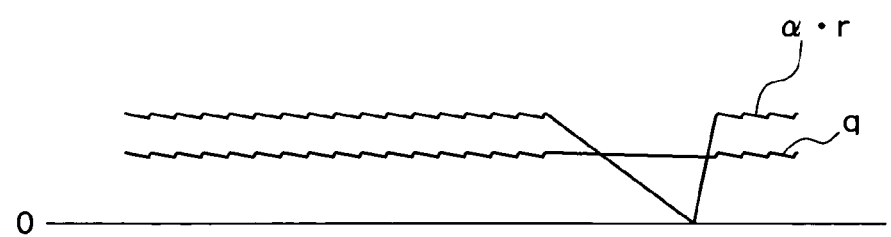
FIG. 5D is a view showing output signals "q" and α·r.
Figure 5E:
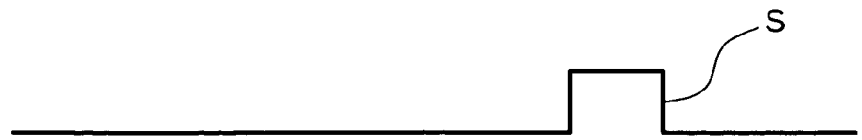
FIG. 5E is a view showing a detected signal "s"

The comparator 28d compares the signal "q" output from the peak-and-hold circuit 28b with a signal produced as a result of a signal "r" output from the peak-and-hold circuit 28c being amplified by a predetermined factor a (e.g., α=1.4). FIG. 5D shows the output signal "q" and the output signal r×α, and the comparator 28d outputs a detected signal "s" whose level becomes high only when output signal "q" becomes large. The output signal "q" maintains its amplitude level even at the position of the changing bit, whereas the amplitude level of the output signal "r" decreases abruptly to substantially zero. Therefore, the detected signal "s" which becomes high at the position of the changing bit can be generated by comparing the output signal "q" with the output signal "r." FIG. 5E shows the detected signal "s."

<Substitution of the Changing Bit and Inverse Conversion of a Gray Code into Binary Data>

There will now be described substitution of a bit at the position of the changing bit performed after detection of the changing bit.

Figure 6:
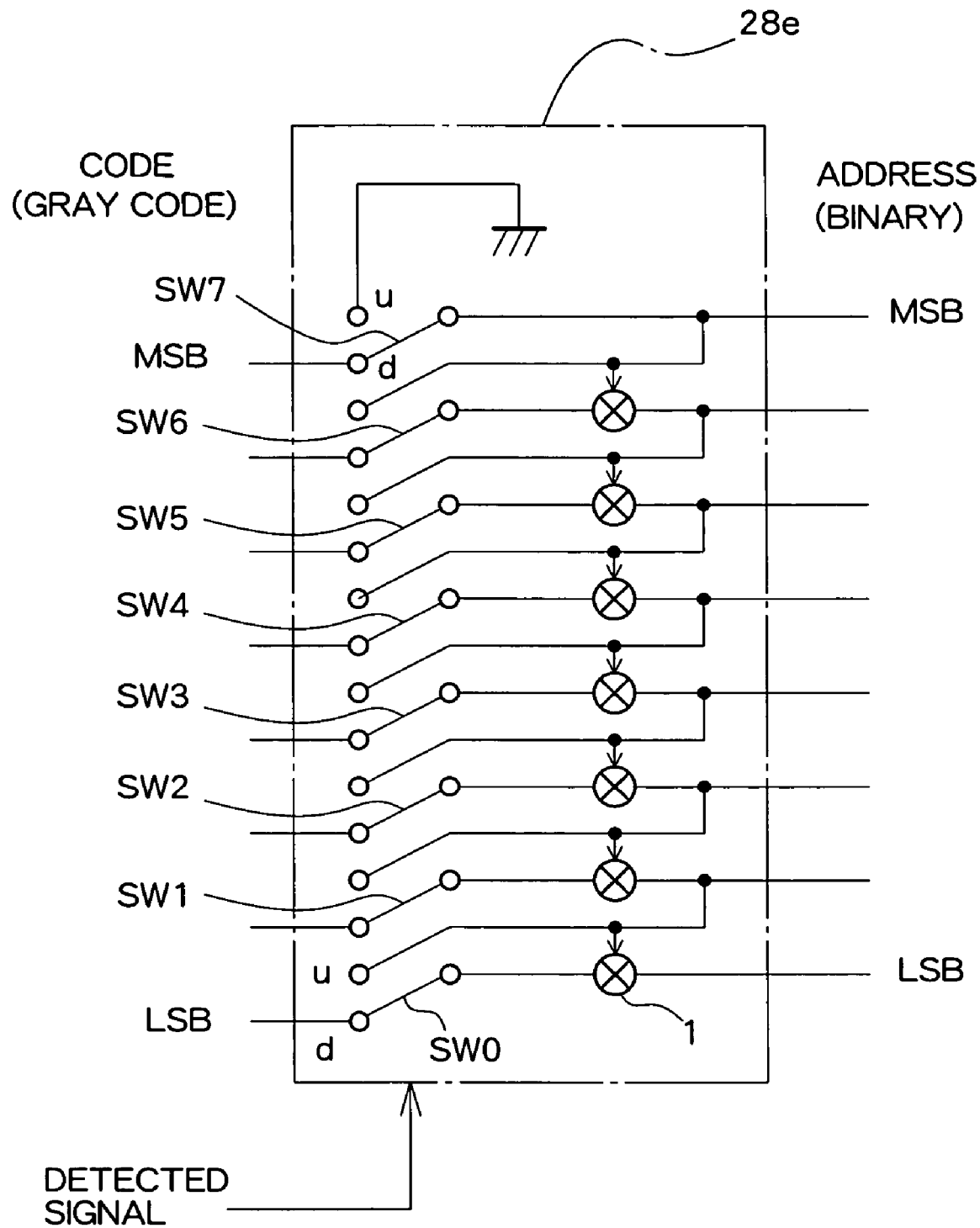
FIG. 6 is a block diagram of a gray code inverse converter of the embodiment.
Figure 7:
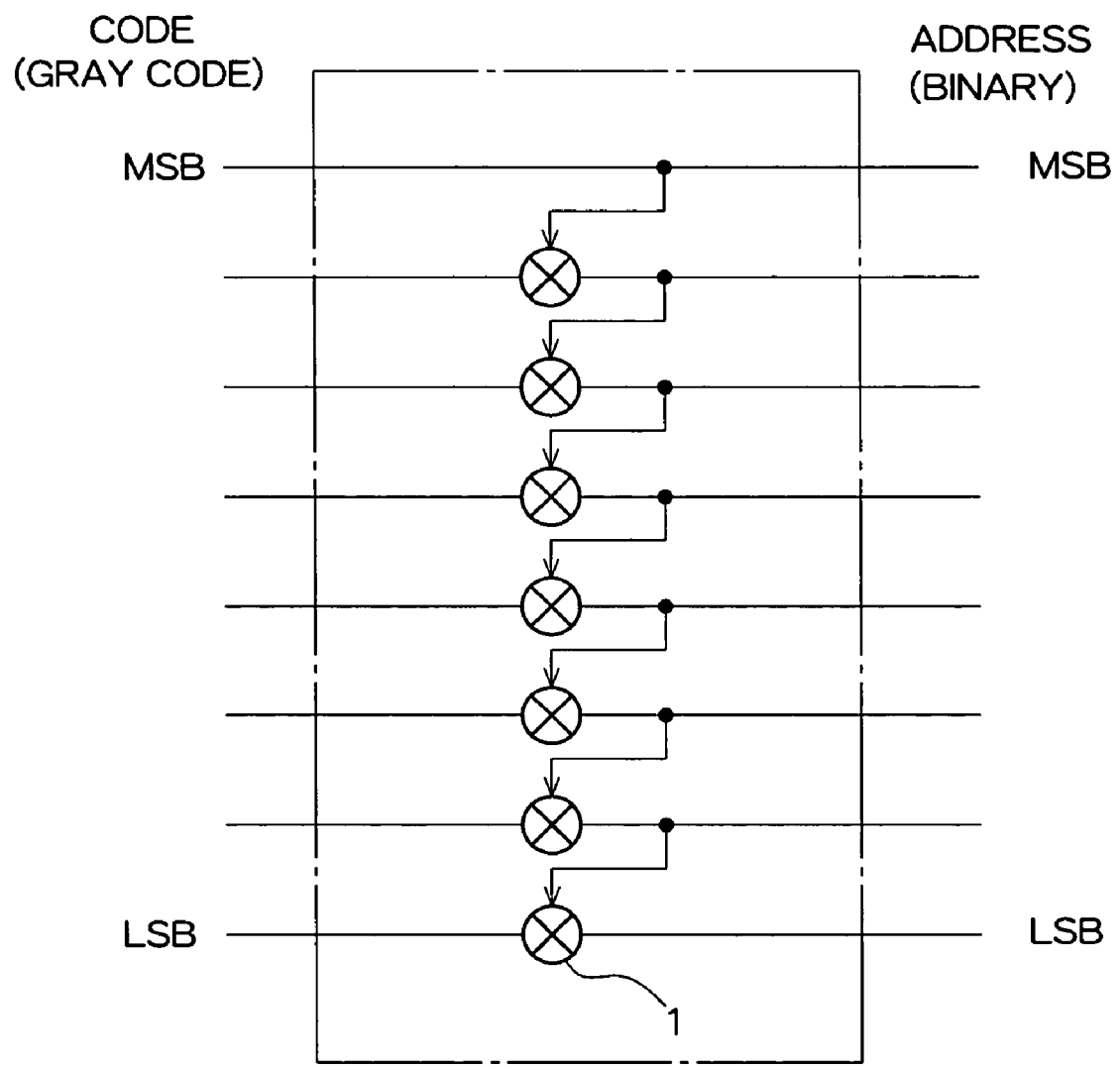
FIG. 7 is a block diagram of a conventional gray code inverse converter.
Figures 23, 24:
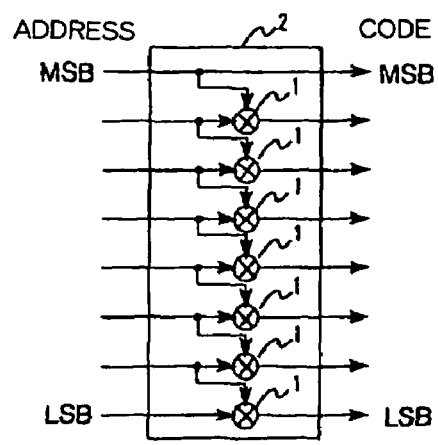
FIG. 23 is a descriptive view of a gray code converter.
FIG. 24 is a descriptive view showing a correlation between address values and gray codes.

FIG. 6 shows a circuit configuration of a gray code inverse converter 28e included in the address decoding circuit 28. The gray code inverse converter 28e is a circuit for demodulating a gray code into original binary data. As shown in FIG. 23, the gray code converter is a circuit for computing exclusive OR of adjacent bits, and the gray code inverse converter basically performs inverse conversion of the exclusive OR result. FIG. 7 shows the configuration of the gray code inverse converter corresponding to the gray code converter shown in FIG. 23. The most significant bit MSB of the gray code is output in its present form, and a bit located below the most significant bit and the most significant bit are subjected to exclusive OR operation by the EX-OR gate 1 and then inversely converted. Similarly, when attention is paid to a certain bit, the bit is converted into binary data as a result of the bit and a binary bit located one above the bit being subjected to exclusive OR operation. The gray code inverse converter 28e of the embodiment shown in FIG. 6 is embodied by addition of switches SW for respective bits to the gray code inverse converter shown in FIG. 7.

Specifically, the most significant bit MSB of the gray code is connected to a contact "d" of a switch SW7, and a remaining contact "u" of the switch SW7 is grounded (corresponding to 0). The least significant bit SLB of the gray code is connected to a contact "d" of a switch SW0, and a remaining contact "u" is connected to a binary bit which is higher than the LSB by one. The other switches SW1 to SW6 are connected in the same manner as is the switch SW0. The respective switches SW0 to SW7 are usually switched to the contact "d." In this case, the switches act in the same manner as does the gray code inverse converter shown in FIG. 7. When the changing bit has been detected, the contact of the switch SW corresponding to the position of the changing bit is switched from the contact "d" to the contact "u." For example, when the changing bit has been detected at the position of the least significant bit LSB of the gray code, the contact of the SW0 is switched from the contact "d" to the contact "u" in accordance with the detected signal. Moreover, when the changing bit has been detected at the second position from the bottom, the contact of SW1 is switched from the contact "d" to the contact "u" in accordance with the detected signal. Likewise, the contact of SW corresponding to the position of the changing bit is switched from the contact "d" to the contact "u."

Figure 8:
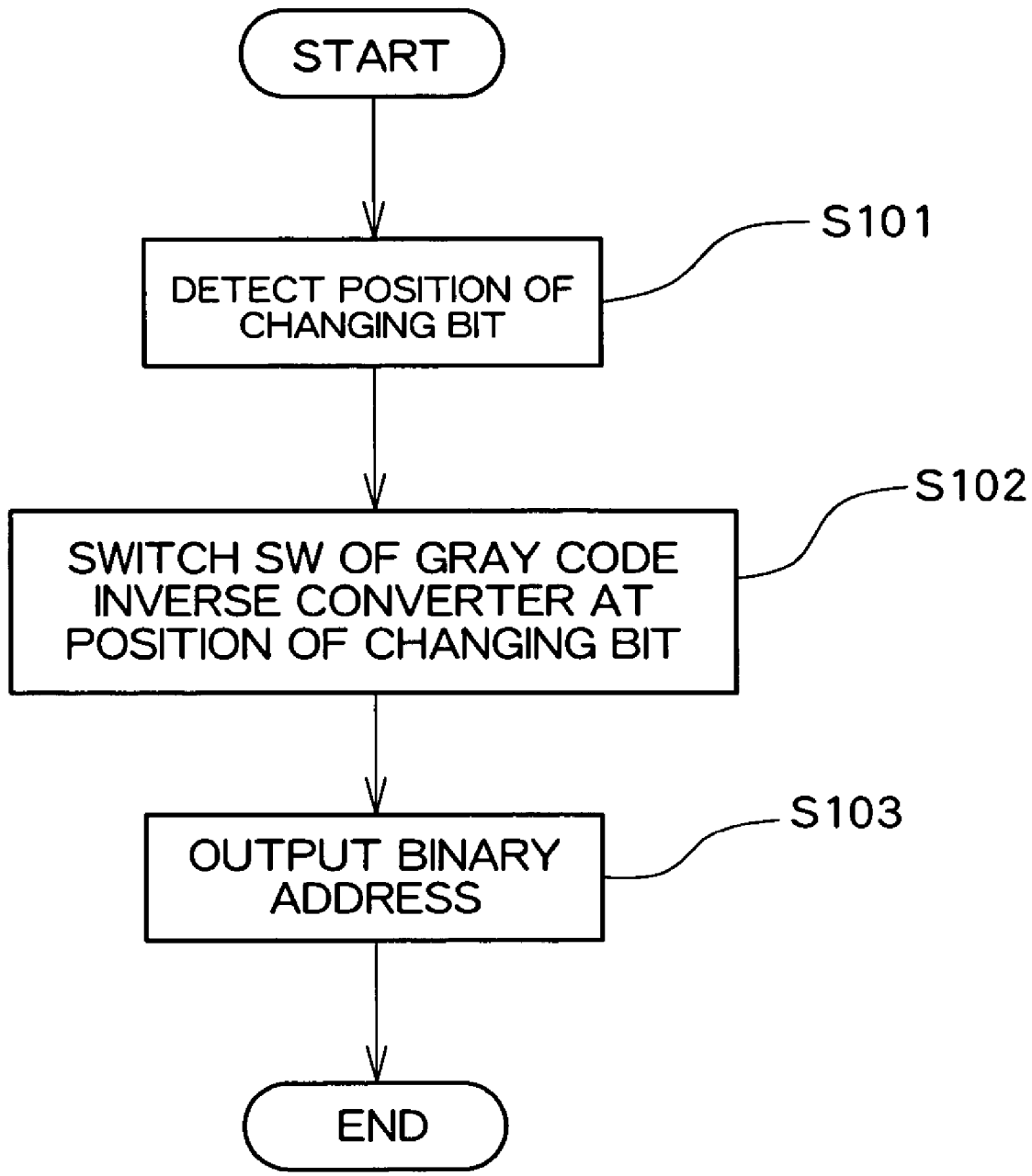
FIG. 8 is a processing flowchart of the embodiment.

FIG. 8 shows a flowchart pertaining to an operation for detecting the address of a land in the embodiment. First, the position of the changing bit in the gray code is detected by means of a changing bit detection circuit of the address decoding circuit 28 (S101). The thus-detected signal is supplied to the gray code inverse converter 28e of the address decoding circuit 28. After the changing bit has been detected, the contact of the switch SW of the gray code inverse converter corresponding to the position of the changing bit is switched (S102). Switching of this contact corresponds to operation for making the track address of the land coincide with the address of an adjacent groove track by means of substituting 0 for the changing bit X. The binary address is output to the system controller 32.

An effect of switching of the switches SW of the gray code inverse converter 28e will now be specifically described.

Figures 9, 10:
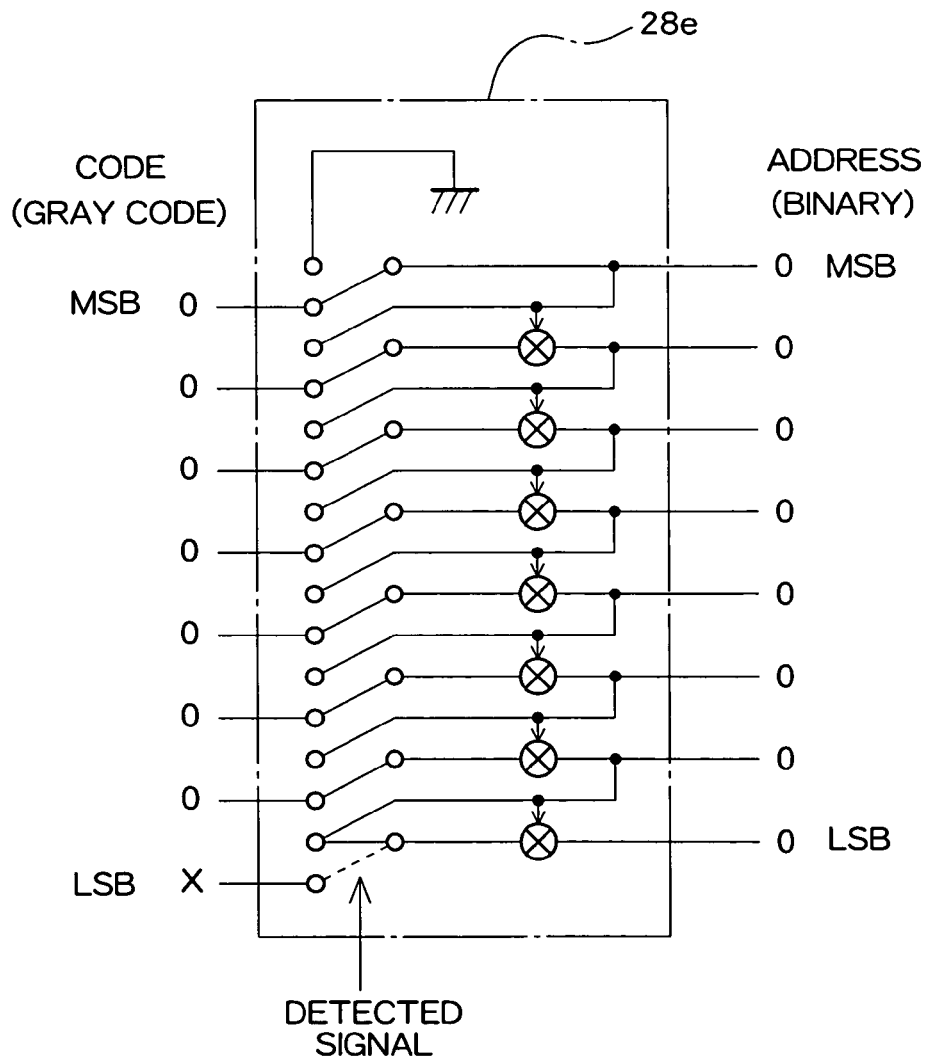
FIG. 9 is a descriptive view showing one G track address system of the embodiment.
FIG. 10 is a view for describing operation of the gray code inverse converter corresponding to the G track address system shown in FIG. 9.

FIG. 9 shows gray codes of the G track address of the groove N and gray codes of the G track address of the groove N+1. The groove N has an address of 00000000, and the groove N+1 has an address of 00000001. The changing bit 100 in the land N is situated at the least significant bit.

FIG. 10 shows the configuration of the gray code inverse converter 28e achieved when the contact of SW0 corresponding to the least significant bit is switched from the contact "d" to the contact "u." All the gray codes of the land N ranging from the most significant bit MSB to the first-order bit are 0s, and the least significant bit assumes an undefined X. The bits ranging from the most significant bit to the first-order bit are converted in accordance with ordinary gray code inverse conversion. For instance, the most significant bit 0 comes to the most significant bit 0 of the binary address in unmodified manner. The sixth-order bit 0 of the gray code and the most significant bit 0 of the binary address are subjected to exclusive OR operation, whereby the sixth-order bit 0 of the binary address is acquired. The fifth-order bit 0 of the gray code and the sixth-order bit 0 of the binary address are subjected to exclusive OR operation, whereby the fifth-order bit 0 of the binary address is acquired. The fourth-order bit 0 of the gray code and the fifth-order bit 0 of the binary address are subjected to exclusive OR operation, whereby the fourth-order bit 0 of the binary address is acquired. The third-order bit 0 of the gray code and the fourth-order bit 0 of the binary address are subjected to exclusive OR operation, whereby the third-order bit 0 of the binary address is acquired. The second-order bit 0 of the gray code and the third-order bit 0 of the binary address are subjected to exclusive OR operation, whereby the second-order bit 0 of the binary address is acquired. The first-order bit 0 of the gray code and the second-order bit 0 of the binary address are subjected to exclusive OR operation, whereby the first-order bit 0 of the binary address is acquired. In connection with the least significant bit LSB X of the gray code, the contact of SW0 has been switched from the contact "d" to the contact "u." The first-order bits 0 of the binary address are subjected to exclusive OR operation, whereby the least significant bit LSB 0 of the binary address is achieved. Eventually, the binary address obtained as a result of inverse conversion of the gray code of the land N assumes 00000000. This address is identical with the track number of an adjacent preceding groove or the track number of an adjacent inner-radius-side groove and hence is correct.

Figures 11, 12:
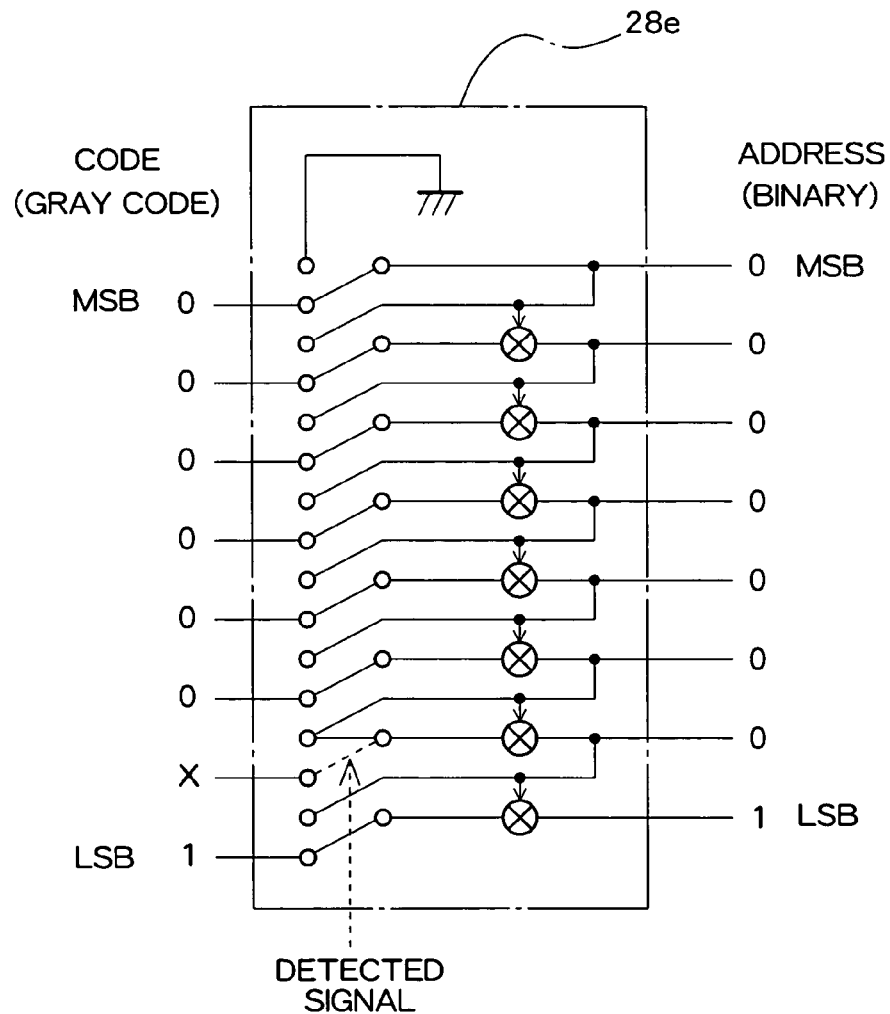
FIG. 11 is a descriptive view showing another G track address system of the embodiment.
FIG. 12 is a view for describing operation of a gray code inverse converter corresponding to the G track address system shown in FIG. 11.

FIG. 11 shows gray codes of the G track address of the groove N+1 and the G track address of the groove N+2. The groove N+1 has an address of 00000001, and the groove N+2 has an address of 00000011. The changing bit 100 in the land N is situated at the first-order bit.

FIG. 12 shows the configuration of the gray code inverse converter 28e achieved when the contact of SW1 corresponding to the first-order bit is switched from the contact "d" to the contact "u." All the gray codes of the land N+1 ranging from the most significant bit MSB to the second-order bit are 0s; the first-order bit is an undefined X; and the least significant bit is 1. The bits ranging from the most significant bit to the second-order bit are converted in accordance with ordinary gray code inverse conversion. For instance, the most significant bit 0 comes to the most significant bit 0 of the binary address in unmodified manner. The sixth-order bit 0 of the gray code and the most significant bit 0 of the binary address are subjected to exclusive OR operation, whereby the sixth-order bit 0 of the binary address is acquired. The fifth-order bit 0 of the gray code and the sixth-order bit 0 of the binary address are subjected to exclusive OR operation, whereby the fifth-order bit 0 of the binary address is acquired. The fourth-order bit 0 of the gray code and the fifth-order bit 0 of the binary address are subjected to exclusive OR operation, whereby the fourth-order bit 0 of the binary address is acquired. The third-order bit 0 of the gray code and the fourth-order bit 0 of the binary address are subjected to exclusive OR operation, whereby the third-order bit 0 of the binary address is acquired. The second-order bit 0 of the gray code and the third-order bit 0 of the binary address are subjected to exclusive OR operation, whereby the second-order bit 0 of the binary address is acquired. In connection with the first-order bit X of the gray code, the contact of SW1 has been switched from the contact "d" to the contact "u." The two second-order bits 0 of the binary addresses are subjected to exclusive OR operation, whereby the first-order bit 0 of the binary address is achieved. Moreover, the least significant bit 1 of the gray code and the first-order bit 0 of the binary address are subjected to exclusive OR operation, whereby the least significant bit 1 of the binary address is achieved. Eventually, the binary address obtained as a result of inverse conversion of the gray code of the land N+1 assumes 00000001. This address is identical with the track number of an adjacent preceding groove or the track number of an adjacent inner-radius-side groove and hence is correct.

The same also applies to other cases. Namely, for example, when the gray code of a groove M assumes 00000111 (a binary address of 00000101) and the gray code of a groove M+1 assumes 00000101 (a binary address of 00000110), the gray code of the land M comes into 000001X1; the first-order bit comes into the changing bit X; the contact of SW1 is switched from the contact "d" to the contact "u"; and an exclusive OR of the second-order bits of the binary addresses is achieved. Hence 0 is achieved at all times. Eventually, the binary address of the land M comes to 00000101, and the track address identical with the binary address of the groove M is obtained.

As mentioned above, the undefined value X situated at the position of the changing bit in the gray code of the land address is substituted with a binary address bit 0 through inverse conversion, whereby a binary address-which is identical with that of an inner radius-side groove adjacent to the land an be obtained. Therefore, the track address of the land is detected through use of only the G track address without detecting the L track address, and data can be recorded/reproduced on/from the land.

Figure 13:
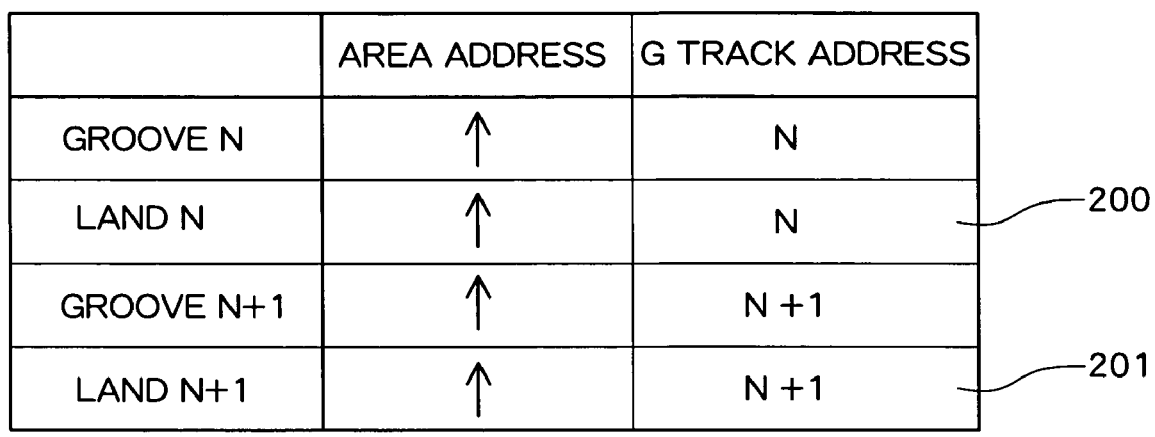
FIG. 13 is a descriptive view of an address format of an optical disk.

FIG. 13 shows the format of the address data of the present embodiment. In addition to the area address, such as segment information, only the G track address is formed as address data pertaining to the optical disk 10. A track address 200 of the land N is detected by means of wobbles of the grooves N and N+1 which are in phase with each other. A track address 201 of the land N+1 is detected by means of wobbles of groves N+1 and N+2 which are in phase with each other. The wobble of the land N and the wobble of the land N+1 are out of phase with each other. Note that, according to the conventional technique shown in FIG. 21, these wobbles are NG.

<Checking Detection of the Position of the Changing Bit>

As mentioned above, in the present embodiment, the position of the changing bit is detected by means of comparing the signals produced as a result of the difference signal A–B being subjected to peak-and-hold operation performed by the two peak-and-hold circuits 28b, 28c with different time constants. There will now be described a method for checking whether or not the thus-detected position of the changing bit is a true bit position.

Figure 14A:
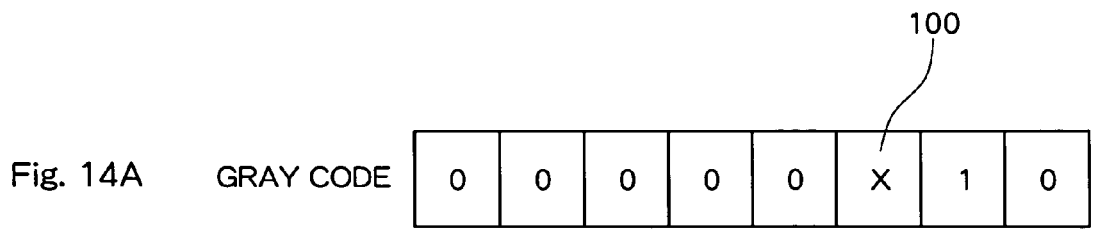
FIG. 14A is a view showing a gray code of a certain land.
Figure 14B:
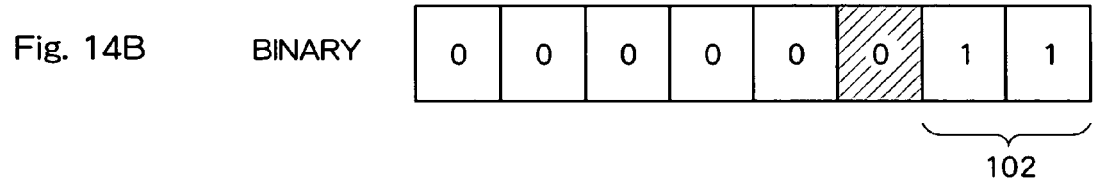
FIG. 14B is a view showing a binary address of that land.

FIG. 14A shows a gray code 00000X1 of a certain land. The changing bit 100 is present in the second-order bit. In the present embodiment, the position of the changing bit 100 is detected, and a contact of a corresponding SW among a group of switches SW of the inverse converter for converting a gray code into a binary address is switched, thereby substituting the binary address of the changing bit with 0. FIG. 14B shows the binary address. The bit of the binary address corresponding to the position of the changing bit always assumes 0, and all bits 102 which are lower than the changing bit assume 1. From the basic configuration of the gray code and the configuration of the gray code inverse converter 28e shown in FIG. 6, it is evident that all the bits 102 in the binary address which are lower than the changing bit assume 1. Specifically, when the second-order bit of the binary address is substituted with 0, the first-order bit of the binary address corresponds to a result obtained by subjecting to exclusive OR operation the second-order bit 0 and the first-order bit 1 of the gray code and, therefore, always assumes 1. The least significant bit of the binary address corresponds to a result obtained by subjecting to exclusive OR operation the first-order bit 1 and the least significant bit 0 of the gray code and, therefore, always assumes 1.

Figure 15A:
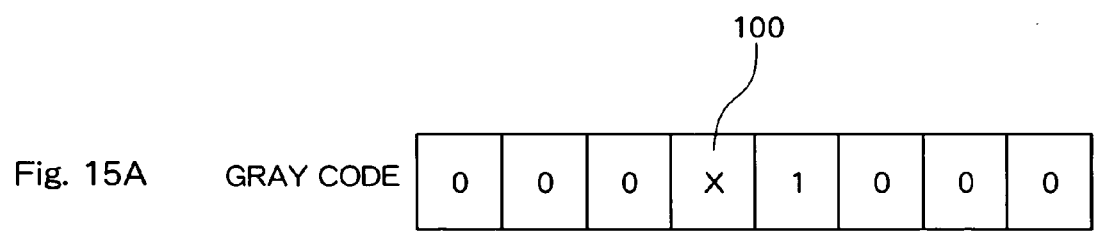
FIG. 15A is a view showing a gray code of the other land.
Figure 15B:
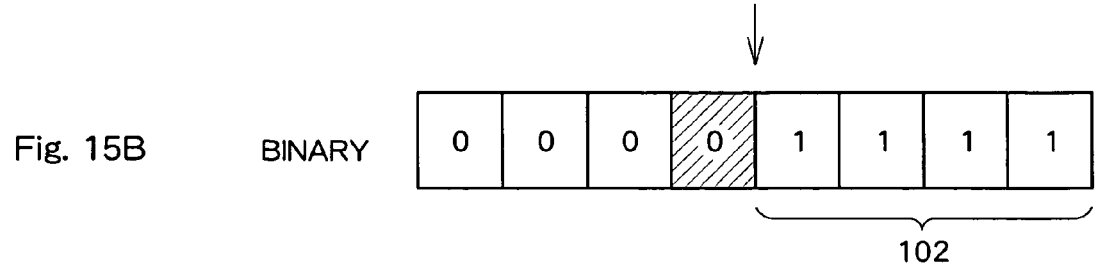
FIG. 15B is a view showing a binary address of that land.

FIG. 15A shows a gray code 000X1000 of another land. The changing bit 100 is present in the fourth-order bit. Even in this case, when the binary address of the changing bit is substituted with 0, all the bits 102 which are lower than the changing bit assume 1, as shown in FIG. 15B.

Thus, when the changing bit is taken as 0 at the time of inverse conversion of the gray code into the binary address, all the bits which are lower than the changing bit assume 1. Therefore, by utilization of this phenomenon, the validity of detection of the changing bit can be verified. Specifically, a determination is made as to whether or not all the bits, which are lower than the changing bit, in the finally-obtained land track address have assumed 1. When all the bits have assumed 1, the operation for detecting the position of the changing bit is determined to be good. In contrast, when none of the bits that are lower than the changing bit assumes 1, the operation for detecting the position of the changing bit is determined to be NG. A determination as to whether or not all the bits assume 1 can be made through use of, e.g., an AND gate which is provided, as inputs, with bits located lower than the changing bit.

The above description has explained the case where the track address of the land is detected from the G track address system. However, the track address of the groove can also be similarly detected from the L track address system. Namely, only the L track system is formed in the optical disk 10, and the track address of the land is detected from the L track address system. Further, the track address of the groove is also detected from the L track address system. In this case, it is desired that the bit for which the wobble becomes opposite in phase at the time of detection of the address of the groove be inversely converted so as to assume 1 in the binary address, thereby making the address coincide with the track number of an outer-radius-side land of the lands adjacent to the groove.

Specific descriptions are as follows. For instance, it is assumed that the gray code of the land N is 00000001 (a binary address of 00000001) and that the gray code of the land N+1 is 00000011 (a binary address of 00000010). In this case, the gray code of the groove N+1 sandwiched between the lands N and N+1 assumes 000000X1. Since the first-order bit has a wobble of opposite phase (i.e., an inner-radius-side wobble of the groove N+1 has a phase of 0°, and an outer-radius-side wobble of the same has a phase of 180°), the bit becomes a changing bit. When the gray code of the groove N+1 is inversely converted into a binary address by means of the gray code converter, inverse conversion is performed such that the binary address of the changing bit assumes 1. As a result, the gray code of the groove N+1 is inversely converted into a binary address 00000010. This binary address is identical with that of the outer-radius-side land N+1, and hence the accurate address is obtained.

A circuit configuration for causing the binary address of the changing bit to assume 1 is arbitrary. However, it is better to add a NOT gate to the contact "u" of, e.g., the gray code inverse converter 28e shown in FIG. 6, to make the NOT gate inoperative at the time of recording/reproduction of data on/from the land, and to make the NOT gate operative at the time of recording/reproduction of data on/from the groove. At the position of the changing bit, there is output an exclusive OR result between the value of a binary address located higher than the changing bit by one and an inverted value of that binary address. Therefore, the binary address achieved at the position of the changing bit always assumes 1.

<When the G Track Address and the L Track Address are Formed>

As mentioned above, in the present embodiment, the track address of the land can be detected from the G track address system (the in-phase wobble of the groove). However, when the G track address system and the L track address system are formed as the address format of the optical disk 10 in the same manner as in the conventional optical disk, the L track address system can be used for verifying the track address of the land detected from the G track address.

Specifically, when the G track address and the L track address are formed, the track address of the land N can be detected solely from the G track address system by means of the previously-described processing. The thus-detected address and the track address obtained by reading the L track address system are compared with each other. If the addresses are identical, the address of the land track detected from the G track address system can be verified as a correct address.

Figure 16:
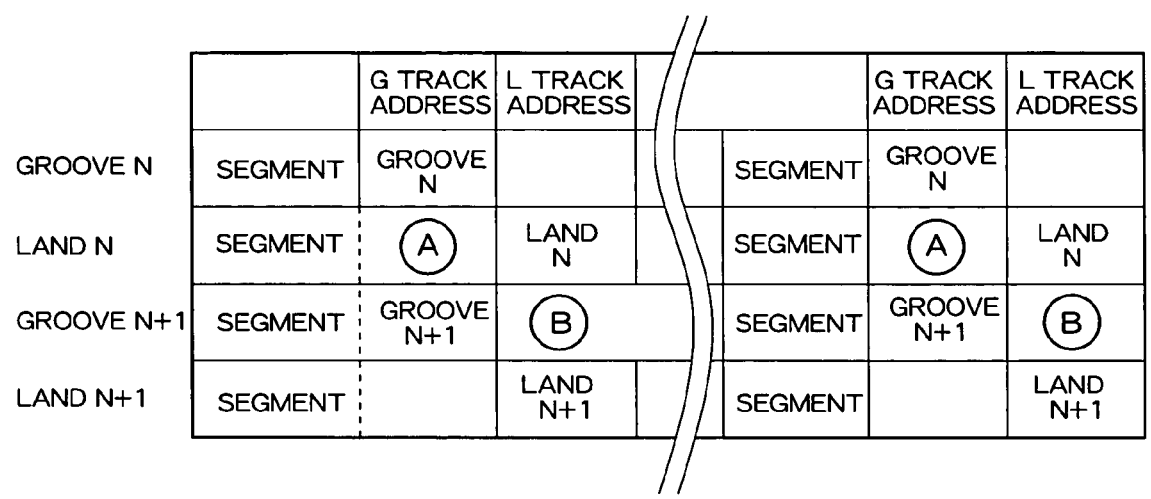
FIG. 16 is a descriptive view of another address format of an optical disk.

FIG. 16 shows the address format of the optical disk 10 achieved when the G track address system and the L track address system are formed. Of the address information items, the area address is designated as a "segment" (i.e., segment information).

In the drawing, the address of a land track (i.e., an area A in the drawing) achieved when data are recorded/reproduced on/from the land N can be detected from the G track address formed in the groove N and the G track address formed in the groove N+1. A groove track address (i.e., an area B in the drawing) achieved when data are recorded/reproduced on/from the groove N+1 can be detected from the L track address formed in the land N and the L track address formed in the land N+1. When the track address of the land is detected from the G track address system, the changing bit is made coincident, while being taken as a binary address 0, with the track address of an inner-radius-side groove among the adjacent grooves in the manner as mentioned previously. When the groove track address is detected from the L track address system, the changing bit is made coincident, while being taken as a binary address 1, with the track address of an outer-radius-side land among the adjacent lands. Specifically, when the track address of the groove N is detected from the L track address system of the land N−1 and the L track address system of the land N, the changing bit is made coincident with the track address of the land N situated on the outer-radius side.

When the track address of the land is detected from the G track address system, the L track address system can be used as an address for checking purpose. Likewise, even when the track address of the groove is detected from the L track address system, the G track address system can be used as an address for checking purpose.

Figure 17:
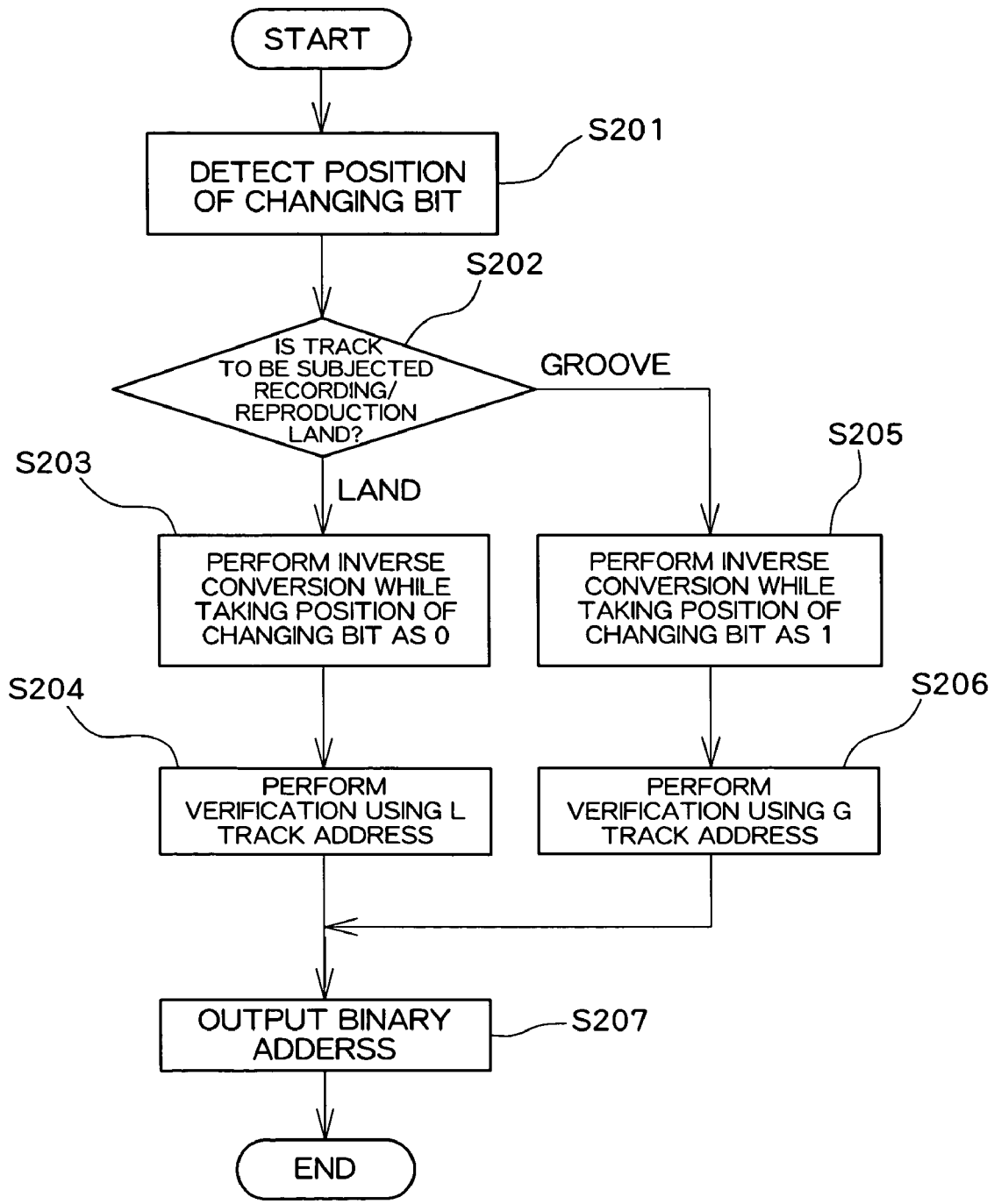
FIG. 17 is another processing flowchart of the embodiment.

FIG. 17 shows a flowchart pertaining to operation of the address decoding circuit 28 for detecting the track address of a groove from the L track address system when data are recorded/reproduced on/from the groove, as well as for detecting the track address of a land from the G track address system when data are recorded/reproduced on/from the land.

First, the position of the changing bit is detected on the basis of the difference signal A–B of the wobble signal (S201). The position of the changing bit can be detected by means of the changing bit detection circuit shown in FIG. 4. Next, a determination is made as to whether or not the track to be subjected to recording/reproducing operation is a land (S202). This determination may also be made by the system controller 32. When the track to be subjected to recording/reproducing operation is a land, a gray code is inversely converted into a binary address such that a changing bit of the track address of the land assumes 0 (S203). As a result, the track address of the land of interest coincides with the track address of the inner-radius-side groove among adjacent grooves. A binary address obtained as a result of a determination being made as to whether or not all the bits lower than the changing bit assume 1 may be checked instead of the binary address obtained in S203. The L groove track address is detected, and verification is made as to whether or not the thus-detected L groove track coincides with the track address detected in S203 (S204). When a coincidence between the addresses is not determined in S204, anomalies of some type are considered to have arisen in the address detected in S203, and the L track address maybe adopted.

When the track to be subjected to recording/reproducing operation is a groove, a gray code is inversely converted into a binary address such that a changing bit of a track address of the groove assumes 1 (S205). As a result, the track address of the groove of interest coincides with the track address of the outer-radius-side land among adjacent lands. A binary address obtained as a result of a determination being made as to whether or not all the bits lower than the changing bit assume 0 may be checked instead of the binary address obtained in S205. From the characteristic of the gray code and the configuration of the gray code inverse converter, it is obvious that all bits which are lower than the changing bit assume 0 under the assumption that the changing bit of the groove is taken as 1. FIGS. 18A, 18B, 19A, and 19B show a relationship between the gray codes and the binary addresses achieved in the case of the track address of the groove. In FIGS. 18A and 18B, when the changing bit 100 of the gray code is substituted with 1 in the binary address, the least significant bit and the first-order bit, all being located lower than the changing address, assume 0. The value of the first-order bit of the binary address is computed by means of subjecting the first-order bit of the gray code and the second-order bit to an EX-OR operation, and the least significant bit is computed by means of subjecting the first-order bit and the least significant bit of the gray code to the an EX-OR operation. Similarly, in FIGS. 19A and 19B, the changing bit of the gray code is substituted with 1 in the binary address, whereby all the bits located lower than the changing bit; that is, the third-order bit to the least significant bit, assume 0.

Turning back to FIG. 17, after acquisition of the track address of the groove, the G track address is detected, and a verification is made as to whether or not the thus-detected track address coincides with the address acquired in S205 (S206). If a coincidence exists between the addresses, the acquired address is output as being a true address (S207).

Although the embodiments of the present invention have been described, the present invention is not limited to the embodiments and is susceptible to various modifications.

For instance, when the track address of the land is detected, the track address is made coincident with the track address of an inner-radius-side groove among adjacent grooves by means of substituting the changing bit with the binary value 0. The track address of the land can also be made coincident with the track address of an outer-radius-side groove of the adjacent grooves by means of substituting the changing bit with the binary 1. Likewise, when the track address of the groove is detected, the track address may be made coincident with the track address of an inner-radius-side land among adjacent lands by means of substituting the changing bit with the binary 0 rather than the track address being made coincident with the track address of an outer-radius-side land among the adjacent lands by means of substituting the changing bit with the binary 1.

In the present embodiment, when the track address of the land is detected, a position where the wobbles of the adjacent grooves become out of phase with each other is taken as the changing bit position, and this changing bit is substituted with the binary 0. However, when the track address of the land in a segment that precedes in time the segment of the land track which is about to be subjected to recording/reproducing operation has already been determined, the position of the changing bit in the next segment can also be predicted. Therefore, the track address of the land in the segment can be detected without actually detecting the position of the changing bit, by means of substituting a binary address of the predicted position with 0. Specifically, when the track address of the land in the advanced-in-time segment has already been determined, the position of the changing bit of the wobble signal in the next segment is identical with that of the changing bit in the advanced-in-time segment. Accordingly, the gray code is automatically substituted with the binary address 0 at that bit position. In this case, there is no necessity for actually detecting the position of the changing bit from the wobble signal. However, the position of the changing bit may be actually detected, and the thus-detected position may be compared with the position of the changing bit predicted from the advanced-in-time segment. Thus, the actually-detected position of the changing bit may be verified. The same also applies to the groove track address. Namely, when the track address of the groove in the advanced-in-time segment has already been determined, the position of the changing bit of the next segment can also be predicted. Therefore, the track address of the groove in the segment is detected without actually detecting the position of the changing bit, by means of substituting the binary address of the predicted position with 1.

Figure 20:
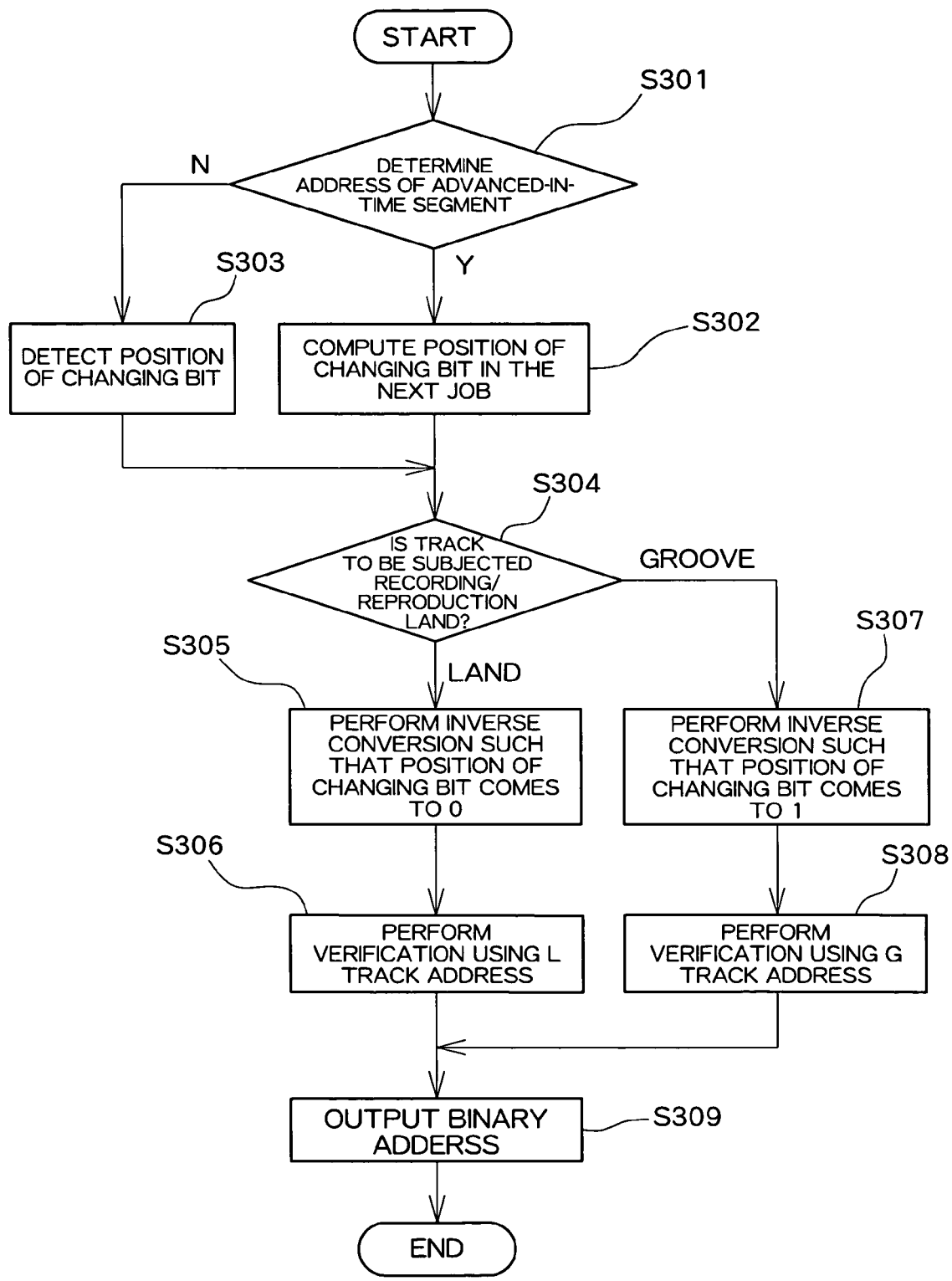
FIG. 20 is yet another processing flowchart of the embodiment.

FIG. 20 shows a processing flowchart required at this time. First, a determination is made as to whether or not the track address in the advanced-in-time segment has already been determined (S301) When the track address of the advanced-in-time segment has already been determined, the track address in the next segment to which attention is paid is logically predicted. Therefore, the position of the changing bit in the track address of the next segment is computed (S302). In contrast, when the track address in the advanced-in-time segment has not yet been determined, the position of the changing bit is actually detected through use of the difference signal A–B (S303). The following processing is the same as that pertaining to S202 and subsequent steps in FIG. 17. In the case of a land, the gray code is inversely converted into a binary address such that the changing bit assumes 0. In the case of a groove, the gray code is inversely converted such that the changing bit assumes 1 (S304 to S309).

The present embodiment has described a case where the optical disk 10 is rotationally driven by ZCAV. However, the optical disk 10 may be divided into a plurality of zones, and the optical disk 10 may be driven such that a constant linear velocity is achieved in each of the zones (ZCLV).

In the present embodiment, when the track address of the land is detected, the address is detected from the in-phase wobble and the wobble of opposite phase. The track addresses of the grooves and those of the lands are serially numbered from the inner radius to the outer radius. Therefore, information about the track address of a land can be determined from information about the track address of an adjacent groove. Specifically, when only the G track address system is formed in the optical disk 10, an in-phase wobble is achieved at all times when data are recorded/reproduced on/from a groove, and hence the track address of the groove can be determined. For this reason, it is essential that, at the time of recording/reproduction of data on/from a land, the track address of the land should not be directly detected but the track address of an adjacent groove should be detected at all times. For instance, when the land to be subjected to recording/reproducing operation is a land N, the track address of a groove N is first determined from an in-phase wobble. When the track address of the groove N has been determined, the track address of the land can be determined even if the wobble of the land is of opposite phase, because the target land N is an outer-radius-side land adjacent to the groove whose track address has been determined. When data are recorded/reproduced on/from a certain land, the only requirement to be fulfilled by the system controller 32 is first to determine the track address of the groove adjacent to the land and predict the track address of the target land while taking the groove as a reference. When the track address of the groove has been determined, the track address of an inner-radius-side land adjacent to the groove is smaller than the determined track by one, but the track address of an outer-radius-side land adjacent to the groove is equal to the determined track. After the address of the target land has been predicted from the determined address of the adjacent groove, the track address of the target land may be actually extracted from the in-phase wobble and the wobble of opposite phase in accordance with the method described in connection with the embodiment. The predicted track address may be compared with the thus-extracted track address, thereby verifying the validity of the predicted track address. As a result, the accuracy of the address is improved. The track address of a groove spaced away from the target land by a predetermined number of tracks, instead of the track address of the groove adjacent to the target land, may be determined, and the track address of the target land may be determined by means of making a jump of a predetermined number of the tracks from the determined groove. When the number of predetermined tracks is set to, e.g., three (on the assumption that the groove adjacent to the groove is assigned a track number one), the address of a groove whose track number is smaller than the object land by one is determined. The address of the land can be determined by means of making a jump of three tracks from the groove address toward the outer radius. The grooves and the lands are formed from the inner radius to the outer radius in sequence of a groove "n," a land "n," a groove "n+1," a land "n+1,". When the target land is the land n+1, the land n+1 is achieved by means of making a jump of three tracks from the groove "n" toward the outer radius.

The same also applies to a case where only the L track address system is formed in the optical disk 10. When data are recorded/reproduced on/from a land, an in-phase wobble is achieved at all times, and hence the track address of the land can be determined. For this reason, it is essential that, at the time of recording/reproduction of data on/from a groove, the track address of the groove should not be directly detected but the track address of an adjacent land should detected at all times. For instance, when the land to be subjected to recording/reproducing operation is a groove N, the track address of a land N is first determined from an in-phase wobble. When the track address of the land N has been determined, the track address of the groove can be determined even if the wobble of the groove is of opposite phase, because the target groove N is an inner-radius-side groove adjacent to the land whose track address has been determined. When data are recorded/reproduced on/from a certain groove, the only requirement to be fulfilled by the system controller 32 is first to determine the track address of the land adjacent to the groove and predict the track address of the target groove while taking the land as a reference. When the track address of the land has been determined, the track address of an inner-radius-side groove adjacent to the land is equal to the determined track, but the track address of an outer-radius-side groove adjacent to the land is larger than the determined track by one. After the address of the target groove has been predicted from the determined address of the adjacent land, the track address of the target groove may be actually extracted from the in-phase wobble and the wobble of opposite phase in accordance with the method described in connection with the embodiment. The predicted track address may be compared with the thus-extracted track address, thereby verifying the validity of the predicted track address. The track address of a land spaced away from the target groove by a predetermined number of tracks, instead of the track address of the land adjacent to the target groove, may be determined, and the track address of the target groove may be determined by means of making a jump of a predetermined number of the tracks from the determined land.

In the present embodiment, the position of the changing bit is detected from a wobble signal through use of the circuit shown in FIG. 4. However, the position of the changing bit can also be detected by means of another method. This method utilizes the relationship that the position of the changing bit in the gray code is always equal to the position of a carry bit in corresponding binary number; that is, the position where a bit is carried from 0 to 1.

Figure 25:
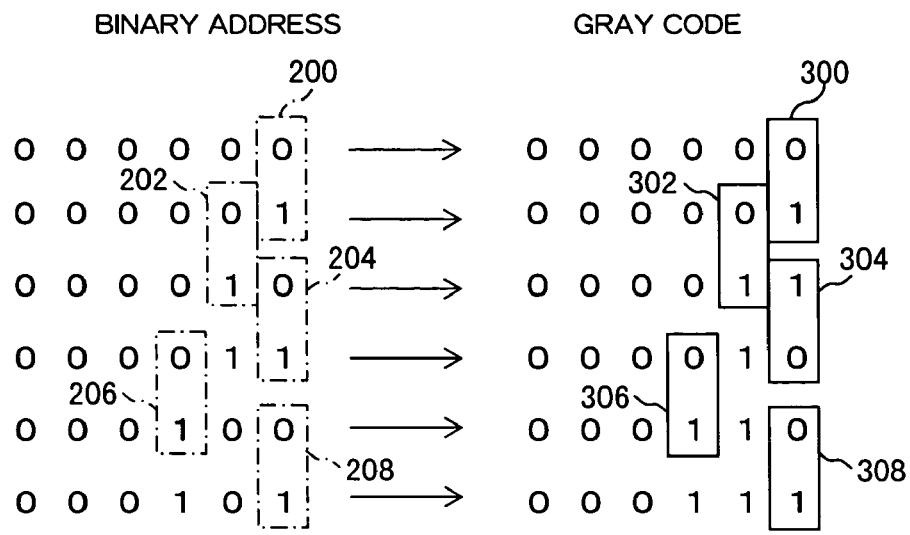
FIG. 25 is another descriptive view showing a correlation between address values and gray codes.

FIG. 25 shows a relationship between binary addresses and gray codes thereof. A binary address 000000 corresponds to a gray code 000000; a binary address 000001 corresponds to a gray code 000001; and a binary address 000010 corresponds to a gray code 000011. When the binary address 000000 shifts to a subsequent binary address 000001, the least significant bit 200 changes from 0 to 1. Even in corresponding gray codes, the least significant bit 300 changes from 0 to 1. The position of a changing bit is the least significant bit 300 and coincides with the least significant bit 200 in the binary address. When the binary address 000001 shifts to the next binary address 000010, a bit (first-order bit) 202 next to the least significant bit changes from 0 to 1. Even in corresponding gray codes, a first-order bit 302 changes from 0 to 1. The position of the changing bit is the first-order bit and coincides with the first-order bit 202 in the binary address. When the binary address 000010 shifts to a subsequent binary address 000011, the least significant bit 204 again changes from 0 to 1. Even in corresponding gray codes, the least significant bit 304 changes from 1 to 0. The position of the changing bit is the least significant bit and corresponds to the least significant bit 204 in the binary address. When the binary address 000011 shifts to a subsequent binary address 000100, the first-order bit 206 changes from 0 to 1. Even in corresponding gray codes, a first-order bit 306 changes from 0 to 1. When the binary address 000100 shifts to the binary address 000101, the least significant bit 208 again changes from 0 to 1. Even in corresponding gray codes, the least significant bit 308 also changes from 0 to 1.

Figure 26:
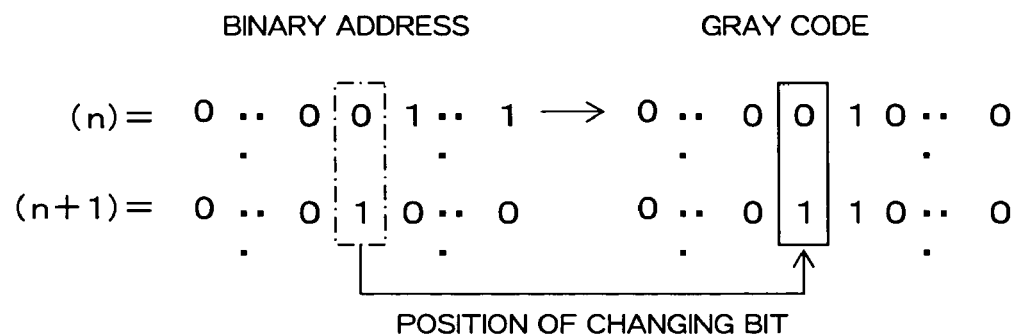
FIG. 26 is a descriptive view describing a relationship between a carrying-over position of a binary address and the position of a changing bit of the gray code.

As mentioned above, the position of the changing bit in the gray code is equal to the position in the corresponding binary address where the bit is carried from 0 to 1. Therefore, the position of the changing bit of the gray code can be detected by means of utilizing the above relationship and detecting the position in the binary address where a carry is to be performed. As shown in FIG. 26, when the binary address of the $n^{th}$ land has been determined, the binary address of the $(n+1)^{th}$ is computed through arithmetic operation, thereby detecting a position where a bit is carried from the $n^{th}$ binary address to the $(n+1)^{th}$ binary address. The positions can be utilized as the positions of changing bits of corresponding gray codes. According to this method, there is no necessity for detecting the position of the changing bit by means of the method and the circuit configuration shown in FIGS. 3A to 3C and FIG. 4, and the position of the changing bit can be detected by means of simple arithmetic operation. When the G track address system and the L track address system are formed in the land track and the groove track, as shown in FIG. 16, a binary address of the land track is easily determined, because the wobbles of the L track address system are in phase with each other. The next binary address is determined from the thus-determined address by means of arithmetic operation. The position of a changing bit in a gray code of the G track address system is determined from these two addresses, through arithmetic operation.

The $(n+1)^{th}$ binary address can be obtained by means of simply adding one to the $n^{th}$ binary address. A position in the $n^{th}$ binary address where a carry is to be performed and A position in the $(n+1)^{th}$ binary address where a carry is to be performed can be constituted by means of a logic circuit formed from an inverter and an AND gate.

Figure 27:
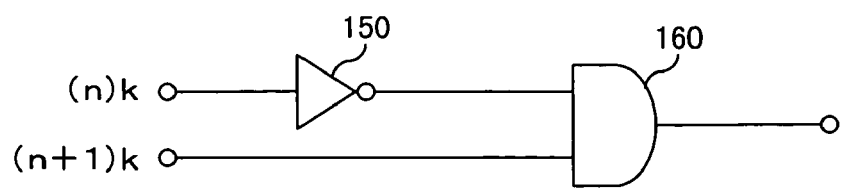
FIG. 27 is a diagram of a circuit for detecting the position of another changing bit (a carrying-over position)

FIG. 27 shows a logic circuit for detecting the position of the carry bit in the binary address. This circuit receives, as inputs, a $k^{th}$ bit of the $n^{th}$ binary address and the $k^{th}$ bit of the $(n+1)^{th}$ binary address. When the binary address is of eight bits, eight logic circuits are provided in parallel so as to correspond to the positions of the respective bits.

The $k^{th}$ bit of the $n^{th}$ binary address decoded and determined by the address decoder circuit 28 is inverted by an inverter 150 and then supplied to an AND gate 160. The $k^{th}$ bit of the $(n+1)^{th}$ binary address obtained through arithmetic operation is supplied in its present form to the AND gate 160. The AND gate 160 subjects the $k^{th}$ bits to AND operation and outputs an AND result. Only when the $k^{th}$ bit of the $n^{th}$ binary address is 0 and the $k^{th}$ bit of the $n+1^{th}$ binary address is 1, the AND gate 160 outputs "1" (or Hi). Of eight outputs from the eight parallel-connected logic circuits, the position of an output which has assumed 1 is detected as the position of the changing bit in the gray code.

The thus-detected position of the changing bit is output as a detected signal to the gray code inversion converter 28e shown in FIG. 12, and the switch SW is automatically switched at the position of the changing bit. As a result, even if a gray code of a land track which becomes opposite in phase is uncertain, the binary address of the land can be obtained.

Flow of an operation for extracting land address is summarized as follows:

(1) Determine a land address "n" (demodulate an address) from the L track address system (address system exclusive to lands);

(2) Compute the next address n+1 from the address "n";

(3) Detect a position where a bit is carried from the address "n" to the address n+1;

(4) Regard the position in (3) where a carry is made as the position of the changing bit in the gray code; and (5) Extract the address of the land from the G track address system while taking binary data as 0 at the position of the changing bit obtained in (4).

In a case where the address of the groove is obtained, when the binary address of the $n^{th}$ groove is determined by means of the G track address system (i.e., the address is demodulated), the binary address of the $(n-1)^{th}$ groove which precedes the $n^{th}$ groove is computed by means of arithmetic operation, thereby detecting a position where a bit is carried from the $(n-1)^{th}$ binary address to the $n^{th}$ binary address. The positions can be utilized as the positions of the changing bit in corresponding gray codes. The reason why the $(n-1)^{th}$ binary address is computed is that a serial track number adjacent to the groove of interest is on the inner radius side and smaller than the track number of that groove by one.

The $(n-1)^{th}$ binary address can be obtained by means of simply subtracting one from the $n^{th}$ binary address. The position where the bit is carried from the $(n-1)^{th}$ binary address to the $n^{th}$ binary address can be realized by a logic circuit formed from an inverter and an AND gate, as in the case of the land. Now, in FIG. 27, the $k^{th}$ bit of the $n^{th}$ binary address and the $k^{th}$ bit of the $(n-1)^{th}$ binary address are taken as inputs. When the binary address is of eight bits, eight logic circuits are provided in parallel so as to correspond to the positions of the respective bits. The $k^{th}$ bit of the $n^{th}$ binary address decoded and determined by the address decoder circuit 28 is supplied to the AND gate 160. The $k^{th}$ bit of the $(n+1)^{th}$ binary address obtained through arithmetic operation is supplied to the AND gate 160 after having been inverted by the inverter 150. The AND gate 160 subjects the $k^{th}$ bits to AND operation and outputs an AND result. Only when the $k^{th}$ bit of the $n-1^{th}$ binary address is 0 and the $k^{th}$ bit of the $n^{th}$ binary address is 1, the AND gate 160 outputs "1" (or Hi). Of eight outputs from the eight parallel-connected logic circuits, the position of an output which has assumed 1 is detected as the position of the changing bit in the gray code.

Flow of an operation for extracting groove address is summarized as follows:

(1) Determine a groove address "n" from the G track address system (address system exclusive to grooves);

(2) Compute a preceding address n−1 from the address "n";

(3) Detect a position where a bit is carried from the address n−1 to the address "n";

(4) Regard the position in (3) where a carry is made as the position of the changing bit in the gray code; and (5) Extract the address of the groove from the L track address system while taking binary data as 1 at the position of the changing bit obtained in (4).

As mentioned above, when the G track address system is formed in the groove tracks and the L track address system is formed in the land tracks, both tracks belonging to the optical disk 10, address information about the land track can be extracted by means of detecting the position of the changing bit in the G track address system through computation of address information about the L track address system. Address information about the groove track can be extracted by means of detecting the position of the changing bit in the L track address system through computation of address information about the G track address system.

In the present embodiment, a necessity for detecting the position of a changing bit is obviated by means of processing a wobble signal. However, the position of a changing bit may be computed through arithmetic operation, and the thus-computed position may be checked against the position of a changing bit detected by the method shown in FIGS. 3A through 3C and the circuit configuration shown in FIG. 4. As a result, the position of the changing bit detected by means of the configurations shown in FIGS. 3A to 3C and FIG. 4 can also be verified. In the present embodiment, the address detected from the L track address system in the land track and the address extracted from the G track address system through arithmetic operation are compared with each other, thereby enabling verification of the extracted G track address system. The same also applies to the groove address.

Figure 28:
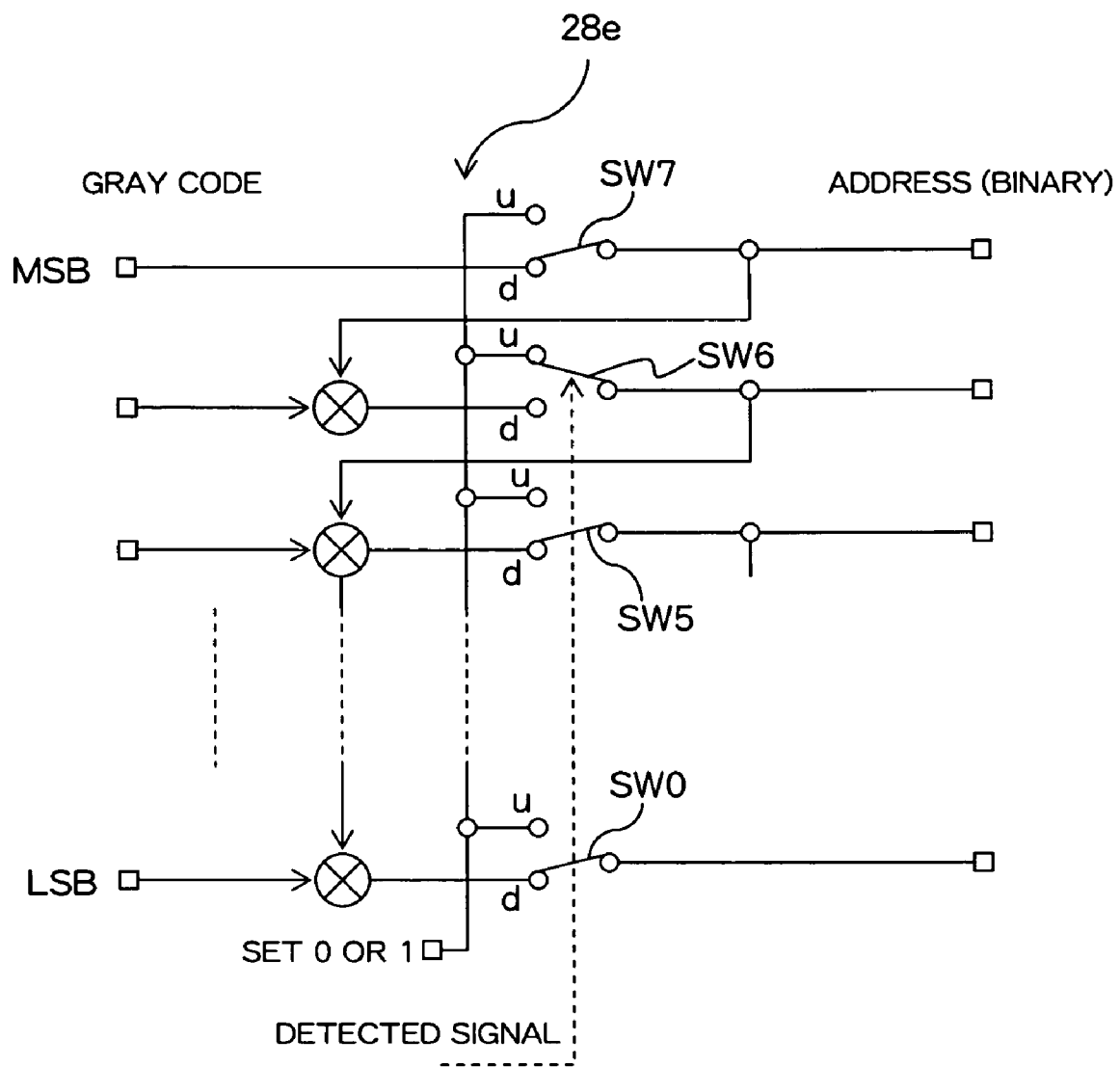
FIG. 28 is a block diagram of another gray code inverse converter.

The configuration of the gray code inversion converter 28e can be embodied as shown in FIG. 28 rather than being embodied as the configuration shown in FIG. 12. In FIG. 28, switches SW are provided in a state subsequent to a plurality of EX-OR gates. As mentioned previously, the most significant bit is directly output as a binary address to the gray code, and hence the EX-OR gates are not present, but only the switches SW are present (it can also be said that the switches SW are provided in a stage subsequent to a gate which permits direct passage of a gray code). Of contacts "u" and "d" of the respective switches SW, the contact "u" is set to 0 or 1. Specifically, when the address is made coincident with the track address located on the inner-radius-side, the contact "u" is set to 0. By way of an example, when the address is made coincident with the track address located on the outer-radius-side, the contact "u" is set to 1. When the address of the outer-radius-side land N adjacent to the inner-radius-side groove N is determined, the contact "u" is set to 0. The contact "d" of the respective switches SW is connected to an output of the EX-OR gate, and outputs from the respective switches SW become binary addresses. The detected signal output from the changing bit position detection circuit shown in FIG. 4 or 27 is supplied to the respective switches SW, and a corresponding switch SW is switched from the contact "d" to the contact "u" at the position of the changing bit. The contacts are maintained at "d" at the positions other than the position of the changing bit. FIG. 28 shows a case where the sixth-order bit is detected as the position of the changing bit. A switch SW6 is switched to the contact "u" at the position of the sixth-order bit, and an output of the sixth-order bit of the binary address assumes 0 at all times. The other bits are output after having been subjected to EX-OR operation along with bits which are higher than the bits according to the principle of the ordinary inversion converter. When the address of the inner-radius-side groove N adjacent to the outer-radius-side land N is determined, the contact "u" is set to 1. At this time, an output from the switch SW6 always assumes 1, and a corresponding bit of the binary address always assumes 1. Thereby, even when the gray code is undefined, an address coincident with the outer-radius-side address is obtained.

The present embodiment has described a case where the groove "n," the land "n," the groove "n+1," the land "n+1," . . . are sequentially formed in the optical disk 10 from the inner radius thereof to the outer radius of the same. The present invention can also be applied, in the same manner, to a case where a land "n," a groove "n," a land "n+1," a groove "n+1," . . . are sequentially formed in the optical disk 10 from the inner radius to the outer radius thereof.

In this case, in relation to the land track, a binary address is determined from the L track address system, and a binary address preceding that binary address is computed. The position of a changing bit in the G track address system is detected from the $(n-1)^{th}$ binary address obtained through arithmetic operation and the determined $n^{th}$ binary address. Namely, bits of the $(n-1)^{th}$ binary address are supplied to the inverter 150, and bits of the $n^{th}$ binary address are supplied in their present forms to the AND gate 160, thereby detecting a bit position where an output from the AND gate 160 assumes 1. In relation to the groove track, a binary address is determined from the G track address system, and a binary address subsequent to that binary address is computed. The position of a changing bit in the L track address system is detected from the determined $n^{th}$ binary address and the $(n+1)^{th}$ binary address obtained through arithmetic operation. Bits of the $n^{th}$ binary address are supplied to the inverter 150, and bits of the $(n+1)^{th}$ binary address obtained through arithmetic operation are supplied in their present forms to the AND gate 160, thereby detecting a bit position where an output from an AND gate 29b assumes 1.

What is claimed is:

1. A disk into which address information is embedded by means of wobbling grooves and lands and which retains data in the grooves and the lands, the disk employing:

said address information which is embedded in a wobble after having been converted into a gray code which sets to one an inter-code distance between two successive address values; and said address information about said land which is defined by means of an in-phase wobble for which an inner-radius-side wobble and an outer-radius-side wobble, both constituting the land, are in phase with each other, and a wobble of opposite phase for which said inner-radius-side wobble and said outer-radius-side wobble are out of phase with each other.

2. A disk into which address information is embedded by means of wobbling grooves and lands and which retains data in the grooves and the lands, the disk employing:

said address information which is embedded in a wobble after having been converted into a gray code which sets to one an inter-code distance between two successive address values; and said address information about said groove which is defined by means of an in-phase wobble for which an inner-radius-side wobble and an outer-radius-side wobble, both constituting said groove, are in phase with each other, and a wobble of opposite phase for which said inner-radius-side wobble and said outer-radius-side wobble are out of phase with each other.

3. A disk into which track address information whose number sequentially increases from an inner radius to an outer radius of said disk is embedded by means of wobbling grooves and lands and which retains data in the grooves and the lands, the disk employing:

said track address information which is embedded in a wobble as a result of binary data being converted into a gray code which sets to one an inter-code distance between successive two address values; and track address information about said land which is defined as a value represented by the wobble in relation to an in-phase wobble for which an inner-radius-side wobble and an outer-radius-side wobble, both constituting the land, are in phase with each other and which is defined as 0 in said binary data in relation to a wobble of opposite phase for which said inner-radius-side wobble and said outer-radius-side wobble are out of phase with each other.

4. A disk into which track address information whose number sequentially increases from an inner radius to an outer radius of said disk is embedded by means of wobbling grooves and lands and which retains data in the grooves and the lands, the disk comprising:

said track address information which is embedded in a wobble as a result of binary data being converted into a gray code which sets to one an inter-code distance between two successive address values; and track address information about said groove which is defined as a value represented by the wobble in relation to an in-phase wobble for which an inner-radius-side wobble and an outer-radius-side wobble, both constituting the groove, are in phase with each other, and which is defined as 1 in the binary data in relation to a wobble of opposite phase for which the inner-radius-side wobble and the outer-radius-side wobble are out of phase with each other.

5. An optical disk drive for recording/reproducing data on/from grooves and lands of an optical disk, wherein address information is embedded by means of wobbling the grooves and lands;

and wherein the address information is embedded in the wobble after having been converted into a gray code which sets to one an inter-code distance between two successive address values, the disk drive comprising:

wobble signal generation means for generating a wobble signal by means of radiating a laser beam on the optical disk and receiving reflected light of said laser beam; and address information extraction means for extracting said address information from said wobble signal, said extraction means extracting address information about a land from an in-phase wobble for which an inner-radius-side wobble and an outer-radius-side wobble, both constituting said land, are in phase with each other, and a wobble of opposite phase for which said inner-radius-side wobble and said outer-radius-side wobble are out of phase with each other.

6. The drive according to claim 5, wherein said address information extraction means further includes inverse conversion means for inversely converting said gray code into an address value of binary data, wherein said inverse conversion means extracts address information about said land by means of inversely converting said gray code, in unmodified form, into a binary data value at a bit corresponding to said in-phase wobble and inversely converting said gray code into a binary data value fixed to 0 at a bit corresponding to said wobble of opposite phase.

7. The drive according to claim 6, wherein said address information extraction means includes detection means for detecting a bit from said wobble signal, said bit corresponding to said wobble of opposite phase, wherein said inverse conversion means inversely converts said gray code into said binary data on the basis of a detected signal output from said detection means.

8. The drive according to claim 6, wherein said inverse conversion means includes a gate circuit which outputs the most significant bit of said gray code, in unmodified form, and EX-OR operation results obtained as a result of subjecting to EX-OR operation bits located lower than the most significant bit of said gray code and bits of binary data which are higher than said lower bits by one; and switching means for switching a signal input to said gate circuit, wherein said switching means performs switching operation at a bit corresponding to said in-phase wobble such that said bit of said gray code is input to said gate circuit and switching operation at a bit corresponding to said wobble of opposite phase such that said bit of said gray code is interrupted and such that a bit of binary data which is higher than said interrupted bit by one is input to said gate circuit.

9. The drive according to claim 6, further comprising:

means for detecting whether or not all bits of said binary data output from said inverse conversion means, said bits being lower than a bit corresponding to said wobble of opposite phase, assume 1.

10. The drive according to claim 6, wherein said address information extraction means further includes means for predicting, on the basis of a determined address of an advanced-in-time segment in said land, a bit corresponding to said wobble of opposite phase of said wobble signal in the next segment, wherein said inverse conversion means inversely converts said gray code on the basis of a predicted bit.

11. The drive according to claim 10, wherein said address information extraction means further includes means for detecting a bit from said wobble signal of said next segment, said bit corresponding to said wobble of opposite phase; and means for comparing said predicted bit with said detected bit.

12. The drive according to claim 6, wherein said inverse conversion means further includes a gate circuit which outputs the most significant bit of said gray code, in unmodified form, and which subjects to an EX-OR operation bits of said gray code, said bits being lower than the most significant bit, along with bits of binary data being higher than said lower bits by one, and outputs a result of EX-OR operation; and switching means for switching an output from said gate circuit, wherein said switching means outputs an output from said gate circuit, in an unmodified form, at a bit corresponding to said in-phase wobble and performs switching operation at a bit corresponding to said wobble of opposite phase such that said output from said gate circuit assumes 0.

13. The drive according to claim 5, further comprising:

means for comparing said address information extracted by said address information extraction means with address information exclusive to the lands that have been formed in said optical disk beforehand and read from said disk.

14. The drive according to claim 5, wherein said address information extraction means has inverse conversion means for inversely converting said gray code into an address value of binary data, wherein said inverse conversion means extracts address information about a land by means of inversely converting said gray code, in unmodified form, into a binary data value at a bit corresponding to said in-phase wobble and inversely converting said gray code into a binary data value fixed to 1 at a bit corresponding to the wobble of opposite phase.

15. The drive according to claim 14, wherein
said address information extraction means further includes
means for predicting, on the basis of a determined address of an advanced-in-time segment in said land, a bit corresponding to said wobble of opposite phase of said wobble signal in the next segment, wherein
said inverse conversion means inversely converts said gray code on the basis of a predicted bit.

16. An optical disk drive for recording/reproducing data on/from grooves and lands of an optical disk, wherein address information is embedded by means of wobbling said grooves and lands; and wherein said address information is embedded in said wobble after having been converted into a gray code which sets to one an inter-code distance between two successive address values, said drive comprising:
wobble signal generation means for generating a wobble signal by means of radiating a laser beam on said optical disk and receiving reflected light of said laser beam; and
address information extraction means for extracting said address information from said wobble signal, said extraction means extracting address information about a groove from an in-phase wobble for which an inner-radius-side wobble and an outer-radius-side wobble, both constituting said groove, are in phase with each other, and a wobble of opposite phase for which said inner-radius-side wobble and said outer-radius-side wobble are out of phase with each other.

17. The drive according to claim 16, wherein
said address information extraction means has inverse conversion means for inversely converting said gray code into an address value of binary data, wherein
said inverse conversion means extracts address information about a groove by means of inversely converting said gray code, in unmodified form, into a binary data value at a bit corresponding to said in-phase wobble and inversely converting said gray code into a binary data value fixed to 1 at a bit corresponding to the wobble of opposite phase.

18. The drive according to claim 17, wherein
said address information extraction means includes
detection means for detecting a bit from said wobble signal, said bit corresponding to said wobble of opposite phase, wherein
said inverse conversion means inversely converts said gray code into said binary data on the basis of a detected signal output from said detection means.

19. The drive according to claim 17, wherein said inverse conversion means includes
a gate circuit which outputs the most significant bit of said gray code, in unmodified form, and EX-OR operation results obtained as a result of subjecting to EX-OR operation bits located lower than the most significant bit of said gray code and bits of binary data which are higher than said lower bits by one; and
switching means for switching a signal input to said gate circuit, wherein
said switching means performs switching operation at a bit corresponding to said in-phase wobble such that said bit of said gray code is input to said gate circuit and switching operation at a bit corresponding to said wobble of opposite phase such that said bit of said gray code is interrupted and such that a bit of binary data which is higher than said interrupted bit by one is input to said gate circuit.

20. The drive according to claim 17, further comprising:
means for detecting whether or not all bits of said binary data output from said inverse conversion means, said bits being lower than a bit corresponding to said wobble of opposite phase, assume 0.

21. The drive according to claim 17, wherein
said address information extraction means further includes
means for predicting, on the basis of a determined address of an advanced-in-time segment in said groove, a bit corresponding to said wobble of opposite phase of said wobble signal in the next segment, wherein
said inverse conversion means inversely converts said gray code on the basis of a predicted bit.

22. The drive according to claim 21, wherein
said address information extraction means further includes
means for detecting a bit from said wobble signal of said next segment, said bit corresponding to said wobble of opposite phase; and
means for comparing said predicted bit with said detected bit.

23. The drive according to claim 17, wherein
said inverse conversion means further includes
a gate circuit which outputs the most significant bit of said gray code, in unmodified form, and which subjects to an EX-OR operation bits of said gray code, said bits being lower than the most significant bit, along with bits of binary data being higher than said lower bits by one, and outputs a result of EX-OR operation; and
switching means for switching an output from said gate circuit, wherein
said switching means outputs an output from said gate circuit, in an unmodified form, at a bit corresponding to said in-phase wobble and performs switching operation at a bit corresponding to said wobble of opposite phase such that said output from said gate circuit assumes 1.

24. The drive according to claim 16, further comprising:
means for comparing said address information extracted by said address information extraction means with address information exclusive to the grooves that have been formed in said optical disk beforehand and read from said disk.

25. The drive according to claim 16, wherein
said address information extraction means has inverse conversion means for inversely converting said gray code into an address value of binary data, wherein
said inverse conversion means extracts address information about a groove by means of inversely converting said gray code, in unmodified form, into a binary data value at a bit corresponding to said in-phase wobble and inversely converting said gray code into a binary data value fixed to 0 at a bit corresponding to the wobble of opposite phase.

26. The drive according to claim 25, wherein
said address information extraction means further includes
means for predicting, on the basis of a determined address of an advanced-in-time segment in said groove, a bit corresponding to said wobble of opposite phase of said wobble signal in the next segment, wherein
said inverse conversion means inversely converts said gray code on the basis of a predicted bit.

27. An optical disk drive for recording/reproducing data on/from grooves and lands of an optical disk, wherein address information is embedded by means of wobbling the grooves and lands; and wherein the address information is embedded in the wobble after having been converted into a gray code which sets to one an inter-code distance between two successive address values, the drive comprises;

wobble signal generation means for generating a wobble signal by means of radiating a laser beam on said optical disk and receiving reflected light of said laser beam; and address information extraction means for extracting said address information from said wobble signal, said extraction means predicting said address information about a land from an in-phase wobble forming a groove which is adjacent to said land or separated from said land by a predetermined number of tracks.

28. The drive according to claim 27, wherein
said address information extraction means predicts said address information about said land as a track address identical with a track address represented by an in-phase wobble constituting an inner-radius-side groove adjacent to said land.

29. The drive according to claim 27, wherein
said address information extraction means predicts said address information about said land as a track address which is smaller than, by one, a track address represented by an in-phase wobble forming an outer-radius-side groove adjacent to said land.

30. The drive according claim 27, further comprising
second address information extraction means for extracting address information about said land from an in-phase wobble for which an inner-radius-side wobble and an outer-radius-side wobble, both constituting said land, are in phase with each other, and a wobble of opposite phase for which said inner-radius-side wobble and said outer-radius-side wobble are out of phase with each other; and means for comparing said predicted address information with address information extracted by means of said second address information extraction means.

31. An optical disk drive for recording/reproducing data on/from grooves and lands of an optical disk, wherein address information is embedded by means of wobbling the grooves and lands; and wherein the address information is embedded in the wobble after having been converted into a gray code which sets to one an inter-code distance between two successive address values, the drive comprises;

wobble signal generation means for generating a wobble signal by means of radiating a laser beam on said optical disk and receiving reflected light of said laser beam; and address information extraction means for extracting said address information from said wobble signal, said extraction means predicting said address information about a groove from an in-phase wobble forming a land which is adjacent to said groove or separated from said groove by a predetermined number of tracks.

32. The drive according to claim 31, wherein
said address information extraction means predicts said address information about said groove as a track address which is larger than, by one, a track address represented by an in-phase wobble forming an inner-radius-side land adjacent to said groove.

33. The drive according to claim 31, wherein
said address information extraction means predicts said address information about said groove as a track address identical with a track address represented by an in-phase wobble constituting an outer-radius-side land adjacent to said groove.

34. The drive according claim 31, further comprising
second address information extraction means for extracting address information about said groove from an in-phase wobble for which an inner-radius-side wobble and an outer-radius-side wobble, both constituting said groove, are in phase with each other, and a wobble of opposite phase for which said inner-radius-side wobble and said outer-radius-side wobble are out of phase with each other; and means for comparing said predicted address information with address information extracted by means of said second address information extraction means.

35. An optical disk drive for recording/reproducing data on/from grooves and lands of an optical disk, wherein address information is embedded by means of wobbling the grooves and lands; and wherein the address information is embedded in the wobble after having been converted into a gray code which sets to one an inter-code distance between two successive address values, the drive comprises;

address information extraction means which extracts address information about a land from an in-phase wobble for which an inner-radius-side wobble and an outer-radius-side wobble, both constituting said land, are in phase with each other, and a wobble of opposite phase for which said inner-radius-side wobble and said outer-radius-side wobble are out of phase with each other, wherein said address information extraction means further includes detection means which computes an address value of next binary data from said address value of said binary data determined from said address information exclusive to said lands formed in said optical disk beforehand, thereby detecting a bit corresponding to said wobble of opposite phase from an address value of said determined binary data and an address value of said computed next binary data; and inverse conversion means for extracting address information about a land by means of inversely converting said gray code, in unmodified form, into a binary data value at a bit corresponding to said in-phase wobble on said basis of a detected signal output from said detection means, and by means of inversely converting said gray code into a binary data value fixed to 0, at a bit corresponding to said wobble of opposite phase.

36. The drive according to claim 35, wherein
said detection means further comprises
an inverter into which a bit of said determined binary address is input; and
a gate circuit which receives, as inputs, an inverted output from said inverter and a bit of said computed next binary address, said bit being located at the same position as said bit of the determined binary address, and which subjects said inverted output and said bit to AND operation.

37. An optical disk drive for recording/reproducing data on/from grooves and lands of an optical disk, wherein address information is embedded by means of wobbling the grooves and lands; and wherein the address information is embedded in the wobble after having been converted into a gray code which sets to one an inter-code distance between two successive address values, the drive comprising:

address information extraction means for extracting address information about a groove from an in-phase wobble for which an inner-radius-side wobble and an outer-radius-side wobble, both constituting said groove, are in phase with each other, and a wobble of opposite phase for which said inner-radius-side wobble and said outer-radius-side wobble are out of phase with each other, wherein said address information extraction means further includes detection means which computes an address value of immediately-preceding binary data from said address value of said binary data determined from said address information exclusive to said grooves formed in said optical disk beforehand, thereby detecting a bit corresponding to said wobble of opposite phase from an address value of said determined binary data and an address value of said computed immediately-preceding binary data; and inverse conversion means for extracting address information about a groove by means of inversely converting said gray code, in unmodified form, into a binary data value at a bit corresponding to said in-phase wobble on said basis of a detected signal output from said detection means, and by means of inversely converting said gray code into a binary data value fixed to 1, at a bit corresponding to said wobble of opposite phase.

38. The drive according to claim 37, wherein
said detection means further comprises an inverter into which a bit of said computed immediately-preceding binary address is input; and a gate circuit which receives, as inputs, an inverted output from said inverter and a bit of said determined binary address, said bit being located at the same position as that of said bit of said immediately-preceding binary address, and which subjects said inverted output and said bit to AND operation.

39. An optical disk drive for recording/reproducing data on/from grooves and lands of an optical disk, wherein address information is embedded by means of wobbling the grooves and lands; and wherein the address information is embedded in the wobble after having been converted into a gray code which sets to one an inter-code distance between two successive address values, the drive comprising:

address information extraction means for extracting address information about a land from an in-phase wobble for which an inner-radius-side wobble and an outer-radius-side wobble, both constituting said land, are in phase with each other, and a wobble of opposite phase for which said inner-radius-side wobble and said outer-radius-side wobble are out of phase with each other, wherein said address information extraction means further includes detection means which computes an address value of immediately-preceding binary data from said address value of said binary data determined from said address information exclusive to said lands formed in said optical disk beforehand, thereby detecting a bit corresponding to said wobble of opposite phase from an address value of said determined binary data and an address value of said computed immediately-preceding binary data; and inverse conversion means for extracting address information about a land by means of inversely converting said gray code, in unmodified form, into a binary data value at a bit corresponding to said in-phase wobble on said basis of a detected signal output from said detection means, and by means of inversely converting said gray code into a binary data value fixed to 1, at a bit corresponding to said wobble of opposite phase.

40. An optical disk drive for recording/reproducing data on/from grooves and lands of an optical disk, wherein address information is embedded by means of wobbling the grooves and lands; and wherein the address information is embedded in the wobble after having been converted into a gray code which sets to one an inter-code distance between two successive address values, the drive comprising:

address information extraction means for extracting address information about a groove from an in-phase wobble for which an inner-radius-side wobble and an outer-radius-side wobble, both constituting said groove, are in phase with each other, and a wobble of opposite phase for which said inner-radius-side wobble and said outer-radius-side wobble are out of phase with each other, wherein said address information extraction means further includes detection means which computes an address value of immediately-subsequent binary data from said address value of said binary data determined from said address information exclusive to said grooves formed in said optical disk beforehand, thereby detecting a bit corresponding to said wobble of opposite phase from an address value of said determined binary data and an address value of said computed immediately-subsequent binary data; and inverse conversion means for extracting address information about a groove by means of inversely converting said gray code, in unmodified form, into a binary data value at a bit corresponding to said in-phase wobble on said basis of a detected signal output from said detection means, and by means of inversely converting said gray code into a binary data value fixed to 0, at a bit corresponding to said wobble of opposite phase.

* * * * *